(12) United States Patent
Gupta et al.

(10) Patent No.: US 12,323,494 B2
(45) Date of Patent: Jun. 3, 2025

(54) METHOD AND SYSTEM FOR SEAMLESS SERVICE CONTINUITY FOR EDGE COMPUTING

(71) Applicant: Samsung Electronics Co., Ltd., Suwon-si (KR)

(72) Inventors: Nishant Gupta, Bangalore (IN); Lalith Kumar, Bangalore (IN); Basavaraj Jayawant Pattan, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/763,482

(22) PCT Filed: Sep. 29, 2020

(86) PCT No.: PCT/KR2020/013293
§ 371 (c)(1),
(2) Date: Mar. 24, 2022

(87) PCT Pub. No.: WO2021/066498
PCT Pub. Date: Apr. 8, 2021

(65) Prior Publication Data
US 2022/0338113 A1    Oct. 20, 2022

(30) Foreign Application Priority Data

Sep. 30, 2019  (IN) .............................. 201941039601
Sep. 21, 2020  (IN) .............................. 2019 41039601

(51) Int. Cl.
*H04W 48/18* (2009.01)
*H04L 67/51* (2022.01)
*H04W 24/10* (2009.01)

(52) U.S. Cl.
CPC ............. *H04L 67/51* (2022.05); *H04W 24/10* (2013.01); *H04W 48/18* (2013.01)

(58) Field of Classification Search
CPC ..... H04W 24/10; H04W 48/18; H04W 36/12; H04L 67/51; H04L 67/148; H04L 41/0893; H04L 67/52
See application file for complete search history.

(56) References Cited

U.S. PATENT DOCUMENTS

2009/0216906 A1* 8/2009 Weniger .............. H04W 36/144
                                                                709/249
2018/0242204 A1   8/2018 Zhu et al.
(Continued)

FOREIGN PATENT DOCUMENTS

WO    2018/125686 A2    7/2018
WO    2019/165876 A1    9/2019

OTHER PUBLICATIONS

Extended European Search Report dated Sep. 20, 2022, issued in European Application No. 20872271.0-1216.
(Continued)

*Primary Examiner* — Anez C Ebrahim
(74) *Attorney, Agent, or Firm* — Jefferson IP Law, LLP

(57) ABSTRACT

Accordingly, embodiments herein disclose a method for seamless service continuity. The method includes: receiving, from a first server (110*a*, 112*a*, 118), data packets related to the service; determining that the UE (102) locates in a service area where the service is provided by both the first server (110*a*, 112*a*, 118) and a second server (110*b*, 112*b*); establishing a connection of the UE (102) with the second server (110*b*) based on determining that the UE (102) locates in the service area; transmitting, to the first server (110*a*, 112*a*, 118), information related to the connection of the UE (102) with the second server (110*b*, 112*b*); receiving, from the first server (110*a*, 112*a*, 118), information including a notification which indicates a transfer of application context of the service to the second server (110*b*, 112*b*) is completed; switching the connection from the first server (110*a*,
(Continued)

112*a*, 118) to the second server (110*b*, 112*b*) based on receiving the information including the notification; receiving, from the first server (110*a*, 112*a*, 118), end data packets related to the service, in response to switching the connection; and continuing the service using the established connection with the second server (110*b*, 112*b*) based on the received end data packets.

10 Claims, 12 Drawing Sheets

(56) References Cited

U.S. PATENT DOCUMENTS

| | | |
|---|---|---|
| 2019/0028934 A1 | 1/2019 | Rasanen et al. |
| 2019/0191341 A1 | 6/2019 | Trang et al. |
| 2019/0191344 A1 | 6/2019 | Wen et al. |
| 2019/0268812 A1 | 8/2019 | Li et al. |
| 2022/0182890 A1* | 6/2022 | Shan ................. H04W 36/0016 |
| 2022/0191292 A1* | 6/2022 | Skubic ................. H04W 36/12 |

OTHER PUBLICATIONS

Chinese Office Action dated Nov. 29, 2023, issued in Chinese Application No. 202080068387.8.
3GPP TR 23.758, V1.0.0, TSG SA; "Study on application architecture for enabling Edge Applications", Sep. 12, 2019.
Indian Office Action dated Dec. 1, 2021, issued in Indian Patent Application No. 201941039601.
Chinese Notice of Allowance with English translation dated Mar. 13, 2025; Chinese Appln. No. 202080068387.8.

* cited by examiner

[Fig. 1]
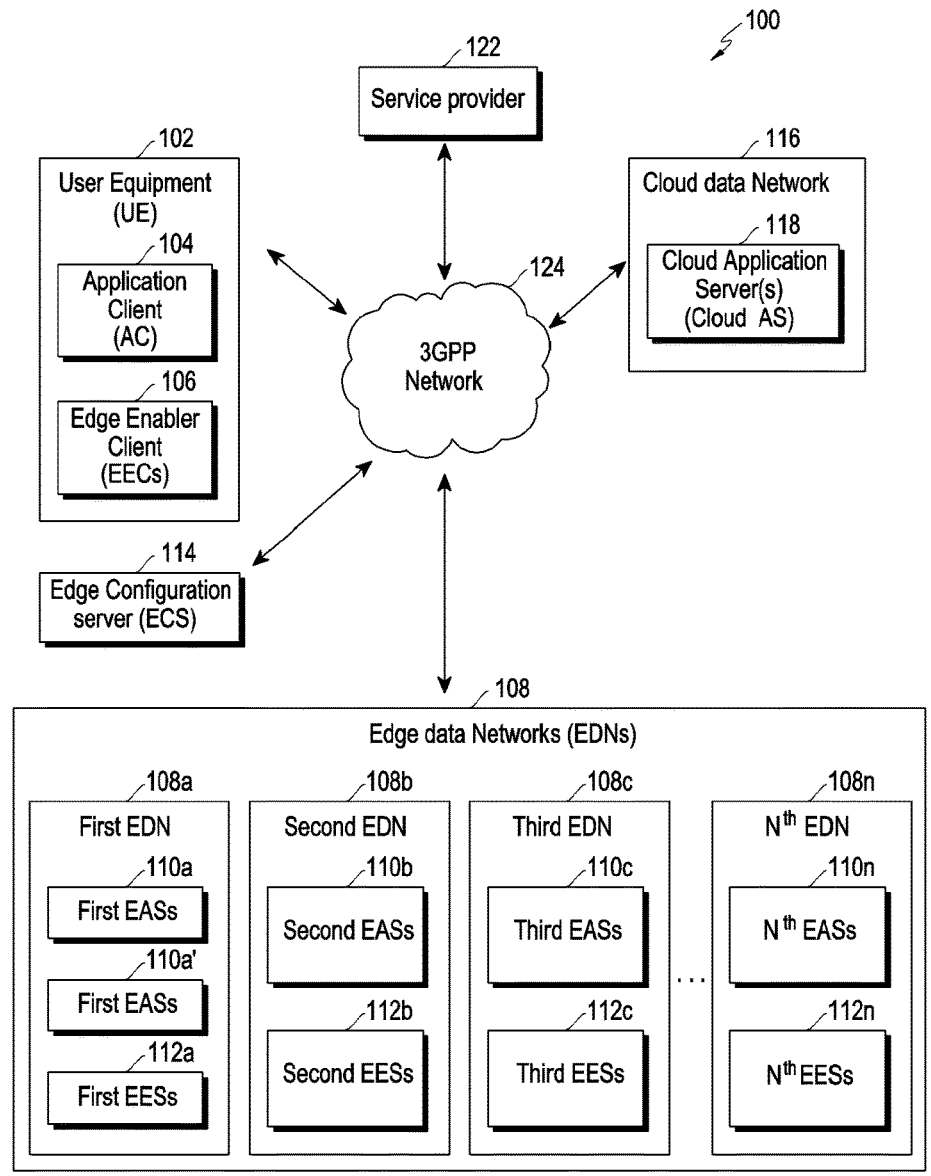
[Fig. 2A]
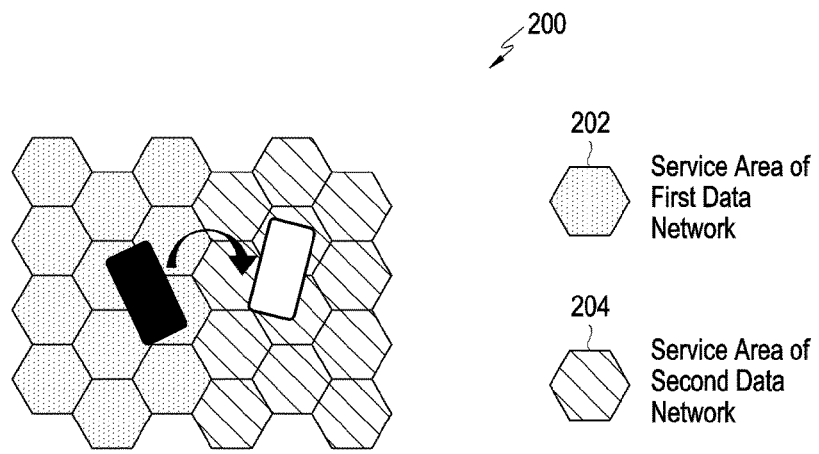

[Fig. 2B]
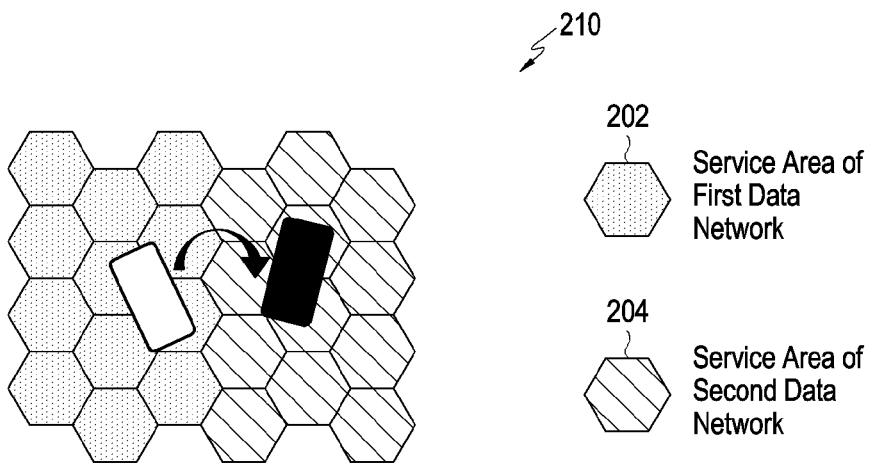
[Fig. 3]
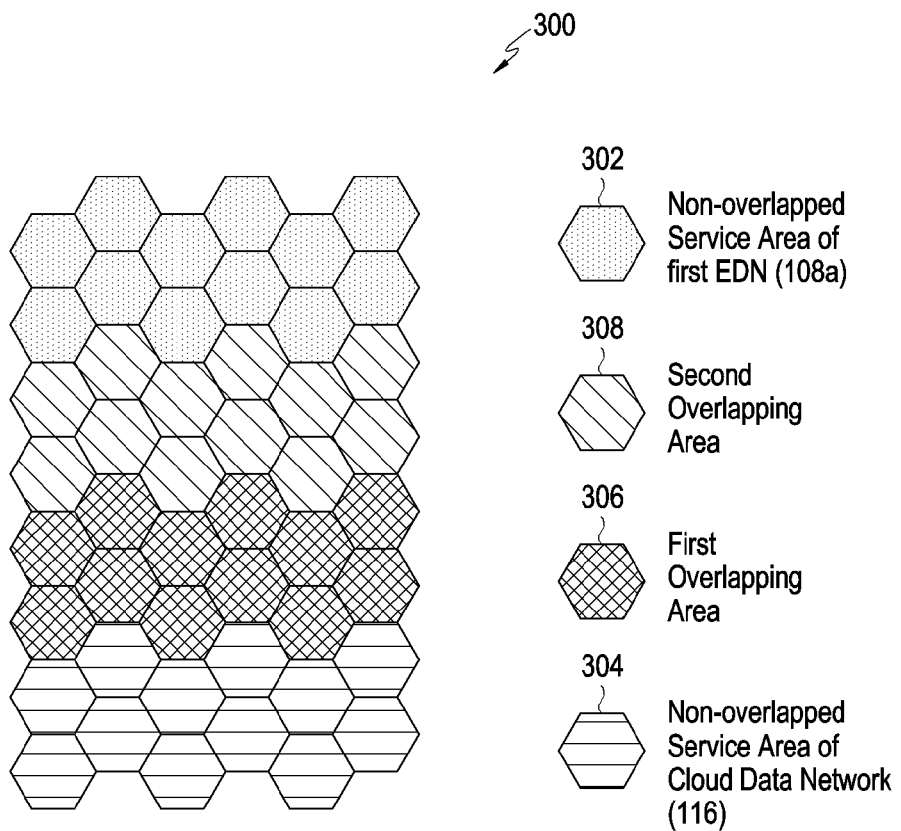

[Fig. 4A]
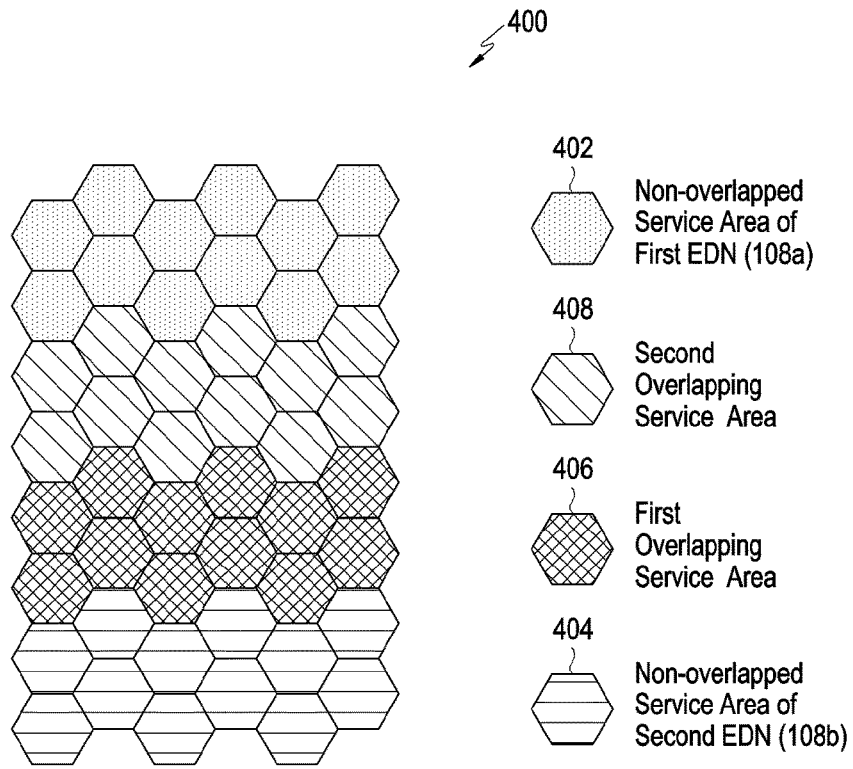
[Fig. 4B]
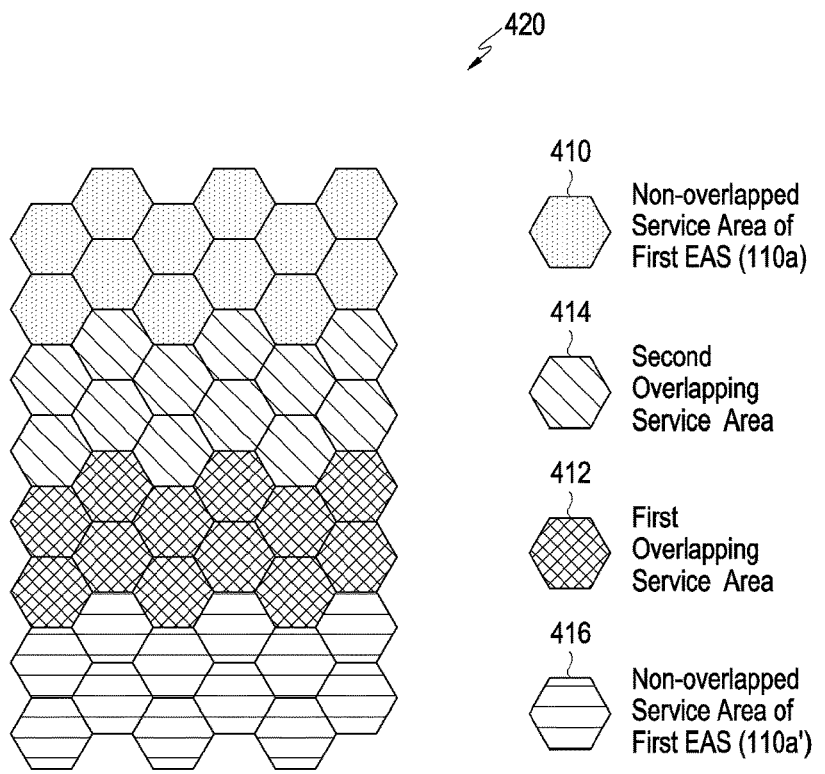

[Fig. 5]
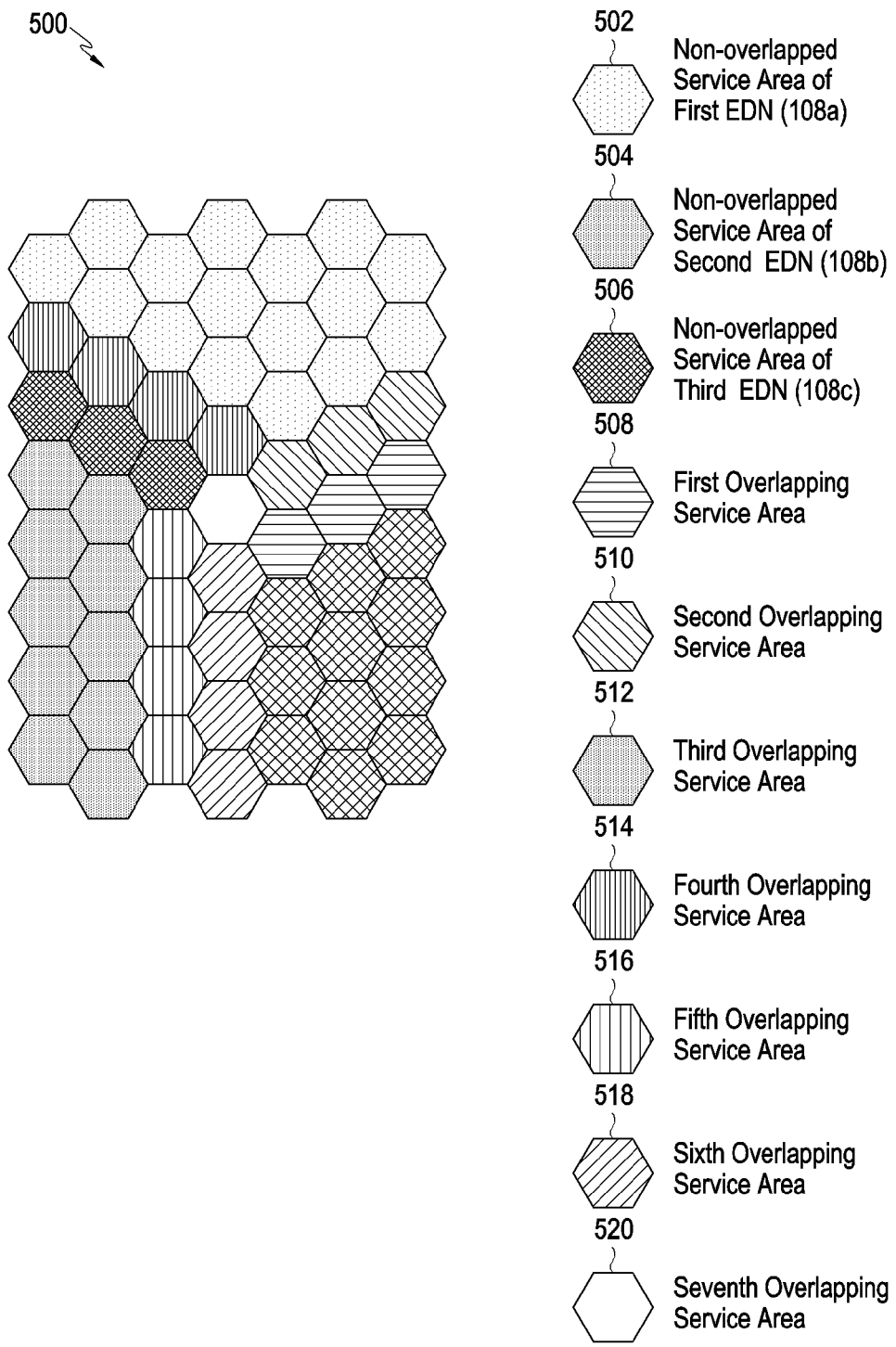

[Fig. 6]
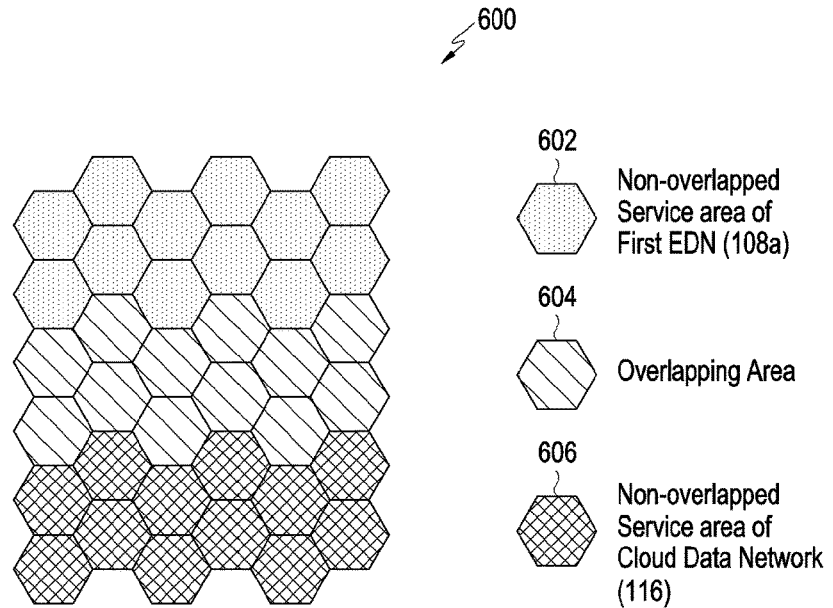
[Fig. 7]
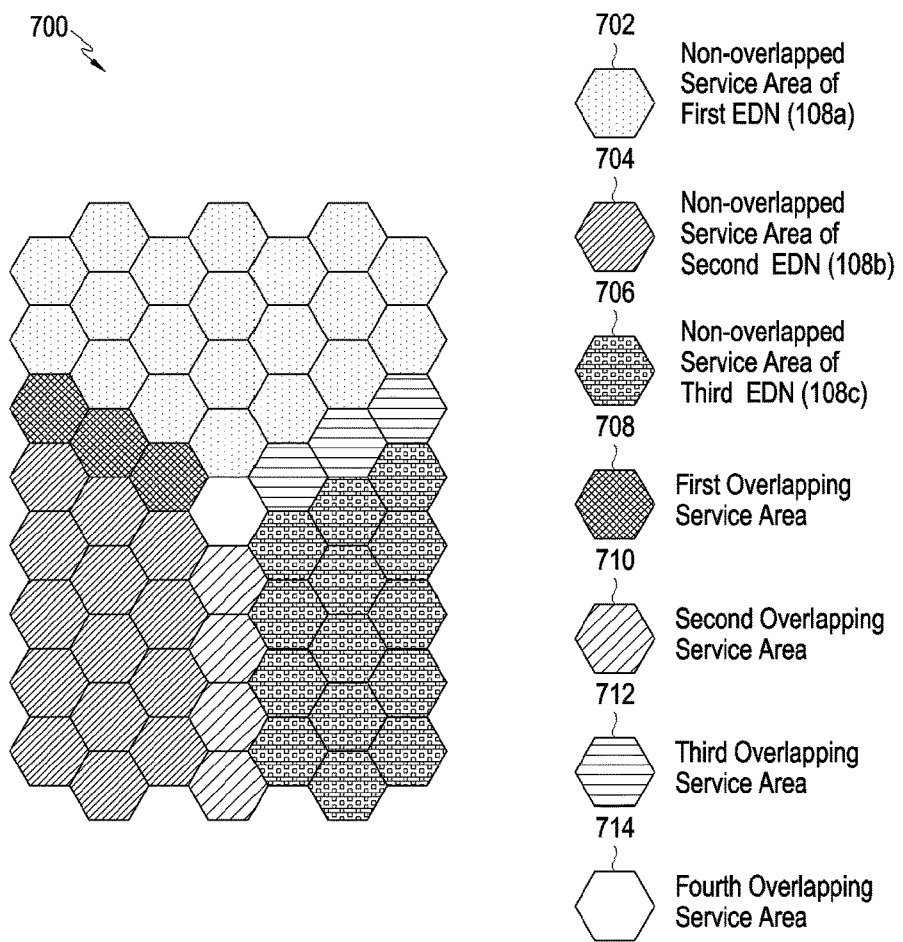

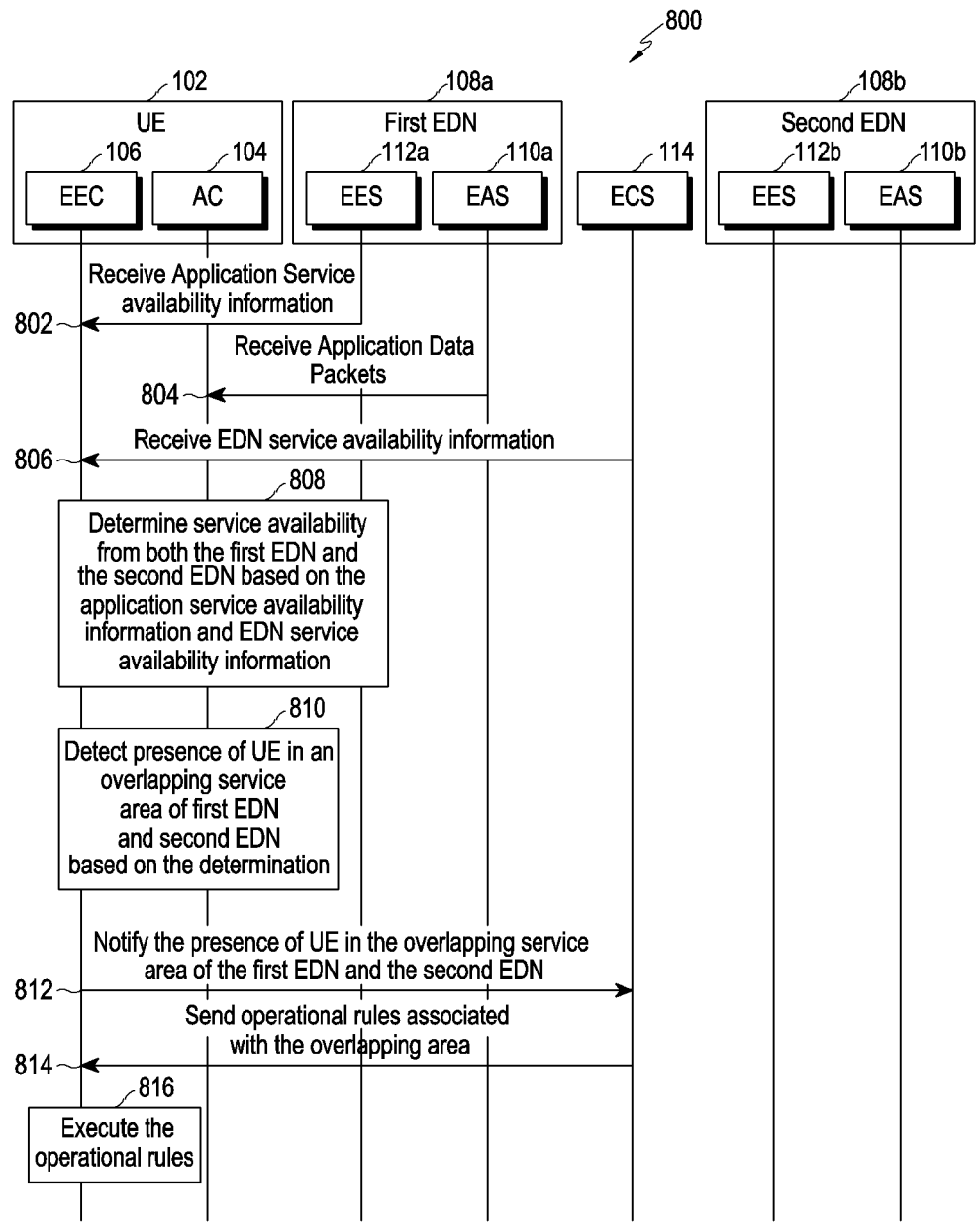
[Fig. 8A]

[Fig. 8B]
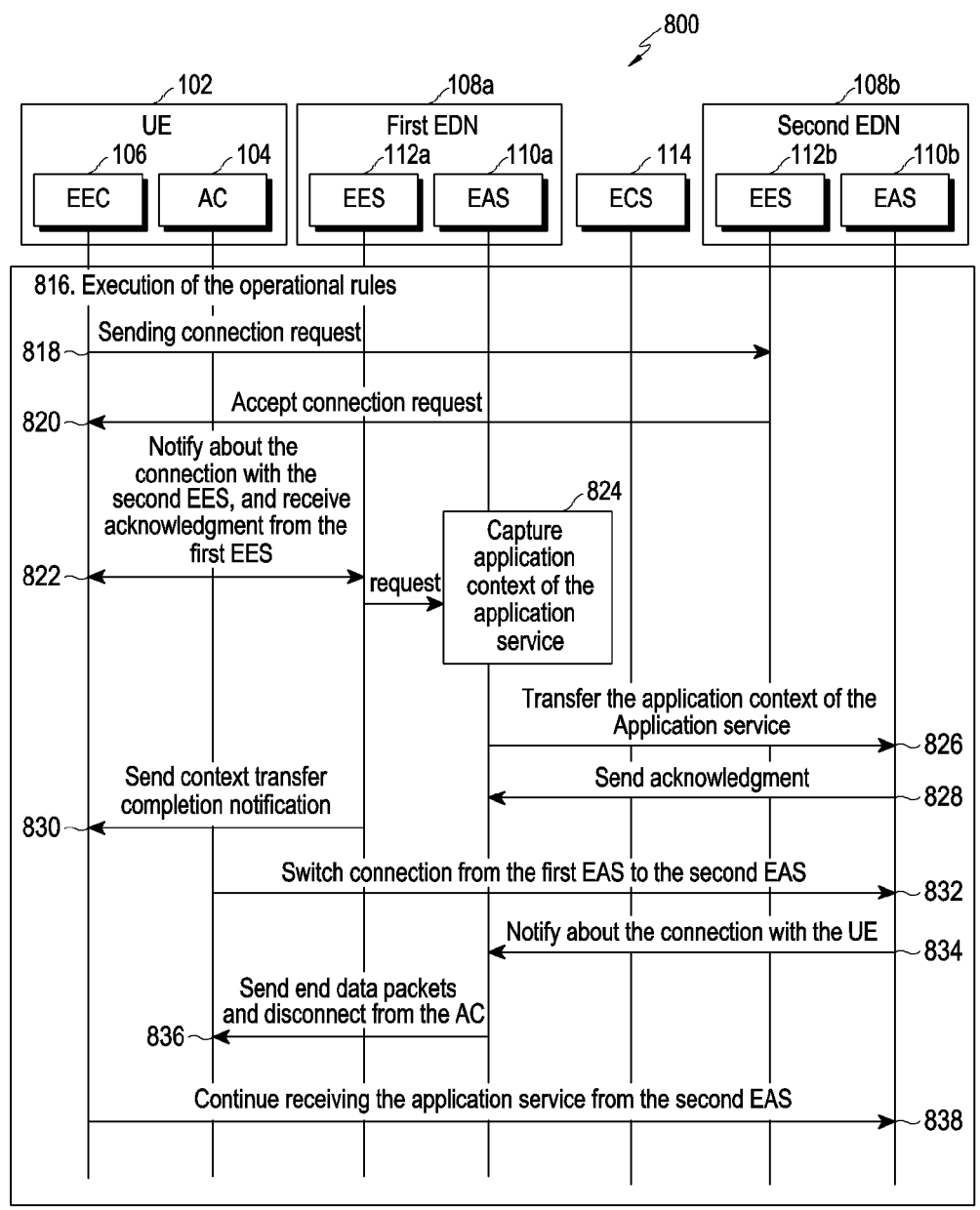

[Fig. 9]
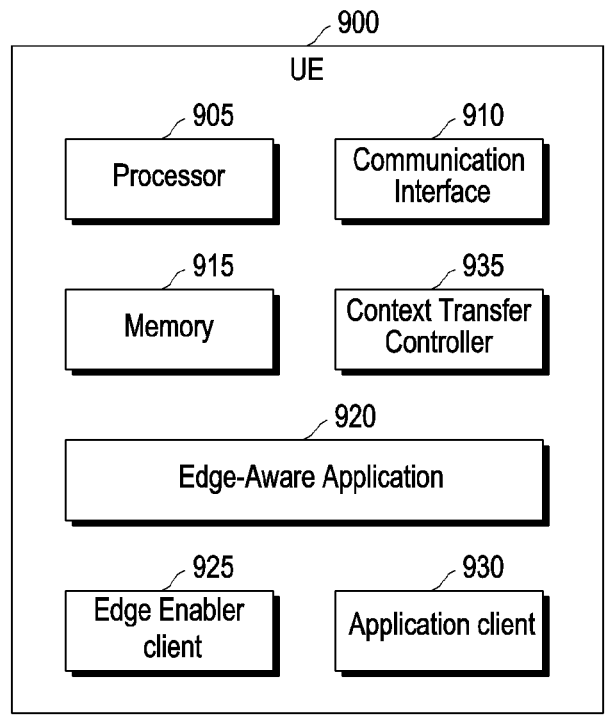
[Fig. 10]
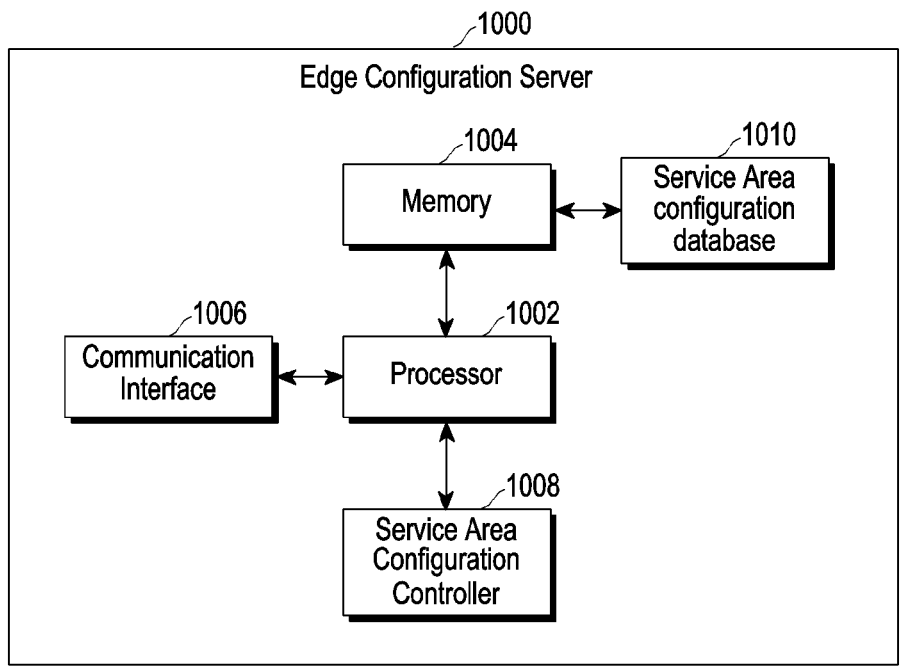

[Fig. 11]
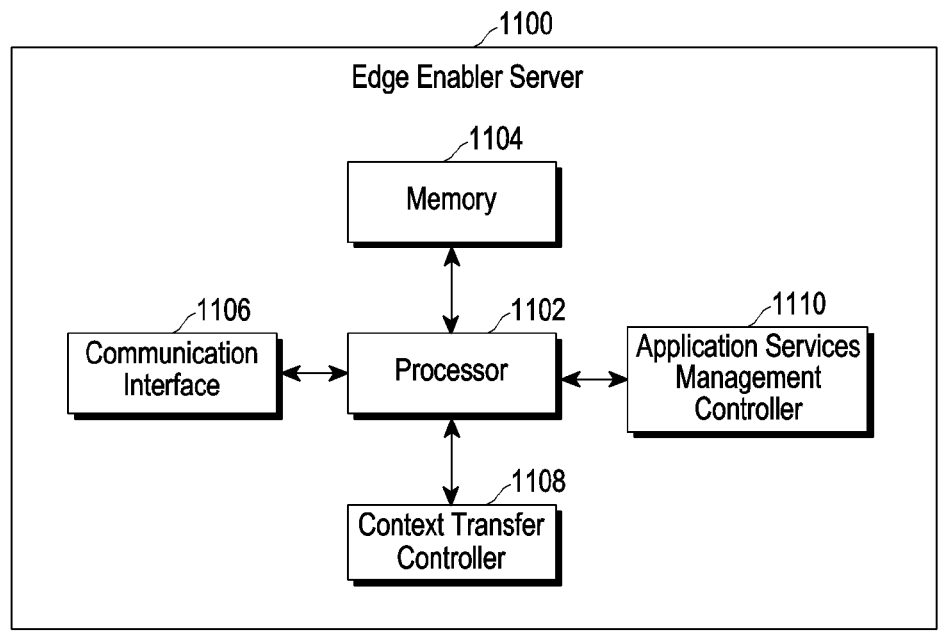
[Fig. 12]
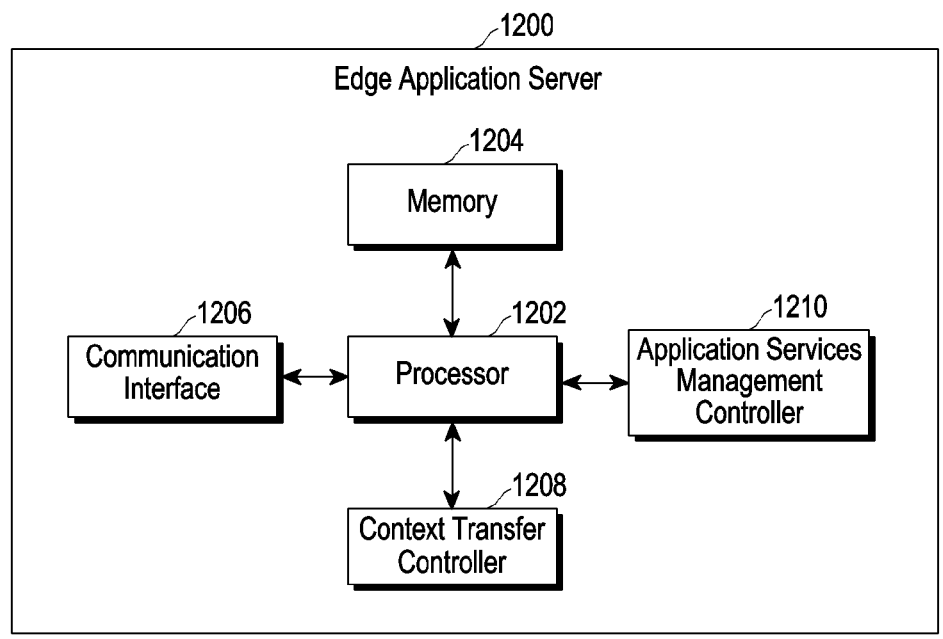

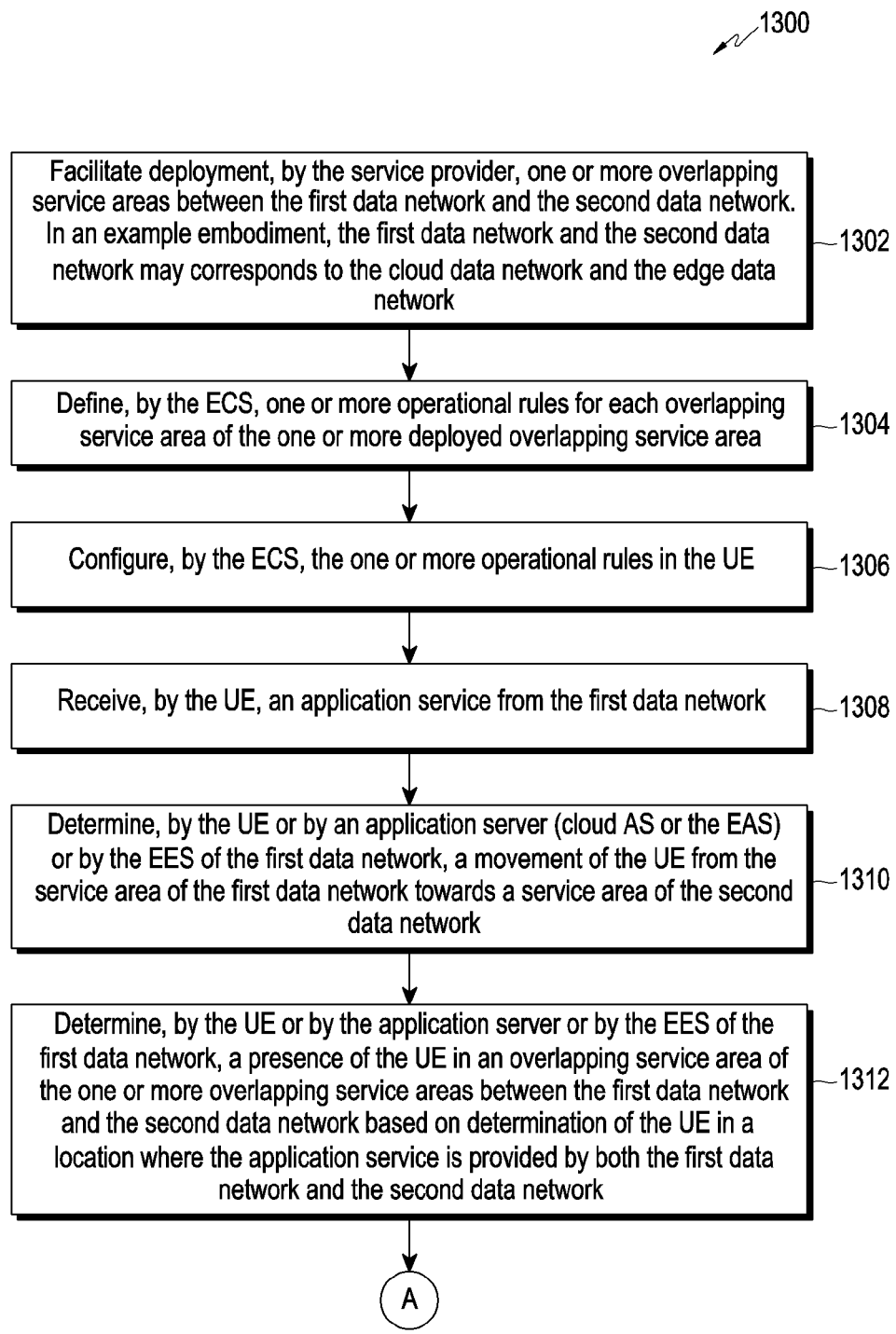
[Fig. 13A]

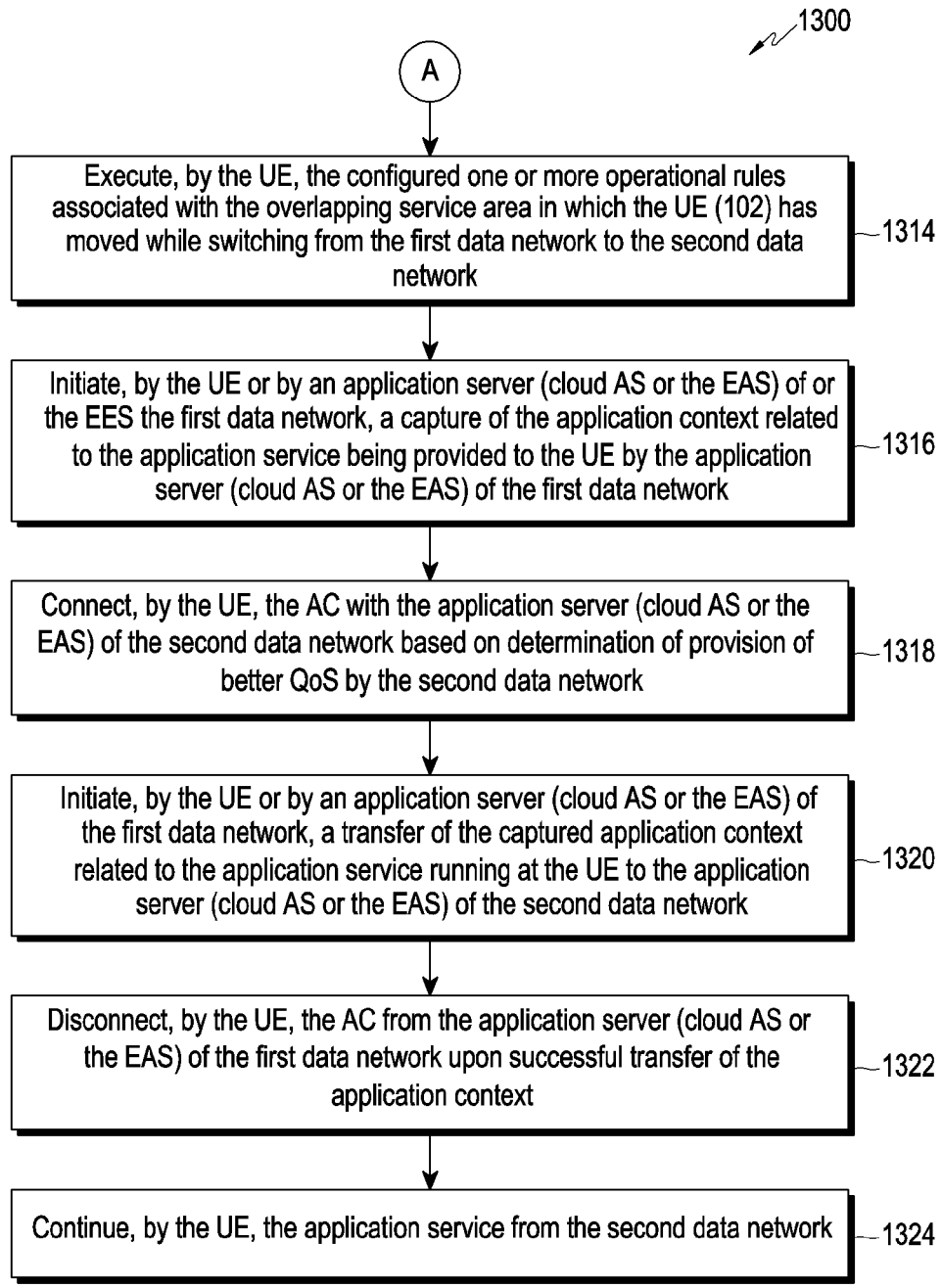

[Fig. 14]
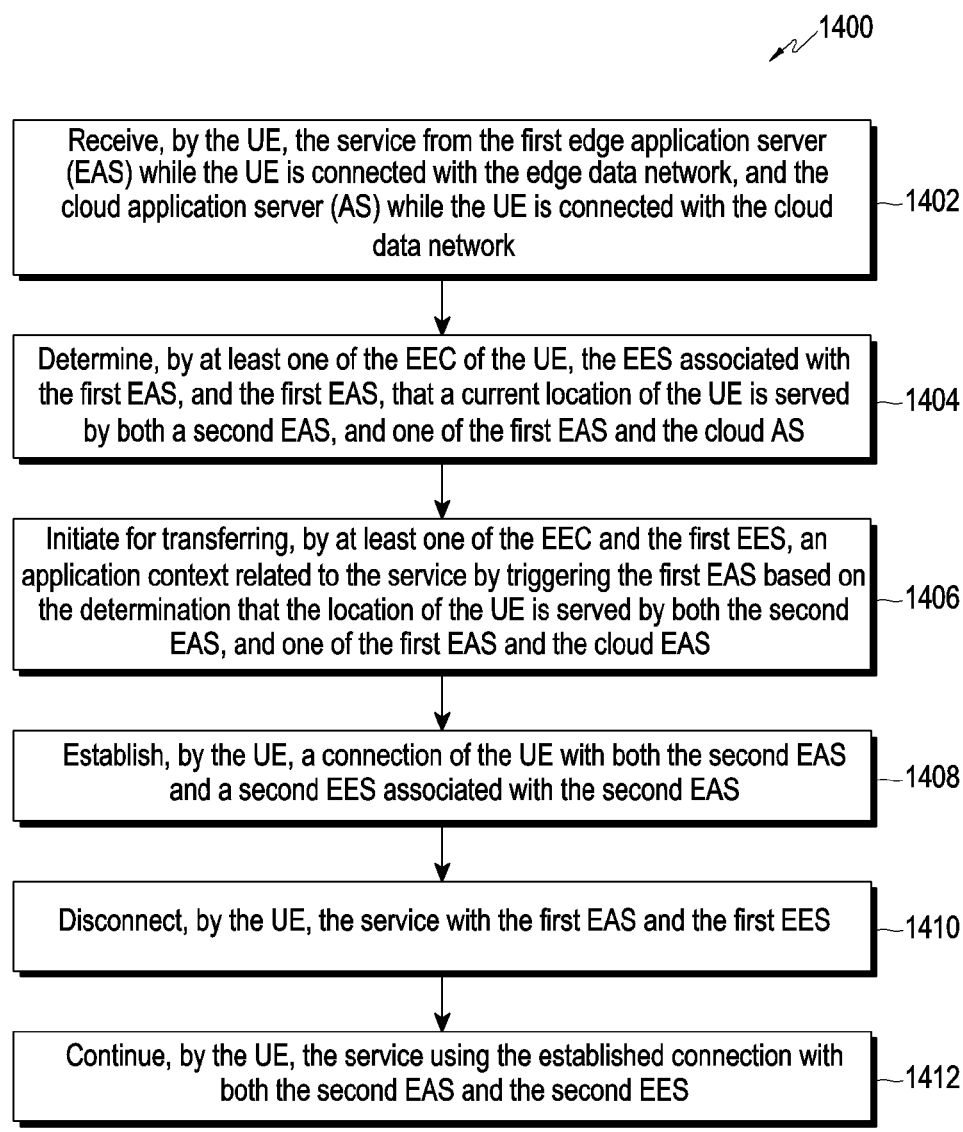

METHOD AND SYSTEM FOR SEAMLESS SERVICE CONTINUITY FOR EDGE COMPUTING

CROSS-REFERENCE TO RELATED APPLICATIONS

This application is a U.S. National Stage application under 35 U.S.C. § 371 of an International application number PCT/KR2020/013293, filed on Sep. 29, 2020, which is based on and claims priority of an Indian provisional patent application number 201941039601, filed on Sep. 30, 2019, in the Indian Patent Office, and of an Indian Complete patent application number 201941039601, filed on Sep. 21, 2020, in the Indian Patent Office, the content of each of which are incorporated herein by reference.

TECHNICAL FIELD

The present disclosure relates to edge computing, and more specifically related to a method and a system for providing seamless service continuity during switching of services being provided to a user equipment from a source data network to a target data network in an edge computing network system. The present application is based on, and claims priority from an Indian Application Number 201941039601 filed on 30 Sep. 2019, the disclosure of which is hereby incorporated by reference herein.

BACKGROUND ART

The development of edge computing in wireless communication has transformed the way of handling and processing data across millions of devices around the world. The massive growth of artificial intelligence and internet of things (IoT) has played role of fuel to drive development of edge-computing network systems. Edge computing supports new applications demanding real-time computing power because of capabilities such as lower latency, higher bandwidth, and reduced backhaul traffic. The applications like VR gaming, autonomous vehicles, robotics, video processing, and network assisted processing rely heavily on the edge computing capabilities.

Generally, in a wireless network system, a user equipment (UE) is connected to nearest data network or application server for availing services. The data network may be a non-edge cloud data network, or an edge data network. Each edge data network includes edge enabler servers (ESs) for managing the application servers, called edge application servers (EASs) when deployed in the edge data networks (EDNs), and cloud application server (Cloud AS) if deployed in non-edge cloud data network. Now, whenever the UE switches from a source data network to a target data network, an application context respective to the service being used by the UE needs to be transferred from the source data network to the target data network. However, the currently employed methods perform the transfer of the application context either when the UE has switched to the target data network or when the UE is about to be switched to the target data network, and both of which lead to noticeable lag in the service or in worst cases, service interruption.

In view of the above, there is a need of a system or method to provide seamless service continuity to the UE during switching from a source data network to the target data network.

Thus, it is desired to address the above mentioned disadvantages or shortcomings or at least provide a useful alternative.

DISCLOSURE OF INVENTION

Technical Problem

The principal object of the embodiments herein is to provide a method and a system for providing seamless service continuity to a UE in a wireless communication network system during switching of the UE from a source data network to a target data network.

Another object of the embodiment herein is to enable application service providers to deploy one or more overlapping service areas between the source data network and target data network. Another object of the embodiment herein is to define operational rules specific to each overlapping service area of the one or more overlapping service areas in order to provide seamless service continuity to the UE during switching from source data network to target data network. The one or more overlapping service areas corresponds to service areas which falls within service areas of multiple data networks, for example, but not limited to, an overlapping service area may correspond to an area in which a service is available from a cloud data network or an edge data network, or the overlapping service area may correspond to an area in which service is available from more than one edge data networks.

Accordingly, embodiments herein disclose a method for providing seamless service continuity in the distributed wireless network system by a user equipment (UE). The method includes receiving, from a first server, data packets related to the service; determining that the UE locates in a service area where the service is provided by both the first server and a second server; establishing a connection of the UE with the second server based on determining that the UE locates in the service area; transmitting, to the first server, information related to the connection of the UE with the second server; receiving, from the first server, information including a notification which indicates a transfer of application context of the service to the second server is completed; switching the connection from the first server to the second server based on receiving the information including the notification; receiving, from the first server, end data packets related to the service, in response to switching the connection; and continuing the service using the established connection with the second server based on the received end data packets.

Accordingly, embodiments herein disclose another method for providing seamless service continuity in the distributed wireless network system by a first server. The method includes transmitting, to a user equipment (UE), data packets related to the service; receiving, from the UE, information related to the connection of the UE with the second server while transmitting the data packets related to the service; transmitting, to the UE, information including a notification that indicates a transfer of application context of the service to the second server is completed, in response to receiving the information related to the connection of the UE with the second server; transmitting, to the UE, end data packets related to the service in response transmitting the information including the notification; and disconnecting a connection of the UE with the first server.

Accordingly, embodiments herein disclose another method for providing seamless service continuity in the distributed wireless network system by a second server. The method includes receiving, from a user equipment (UE), a connection request; transmitting, to the UE, a connection response indicating that accepts the connection request is accepted; after a connection of the UE with a first server is switched to a connection of the UE with the second server, transmitting, to the first server, information related to the connection of the UE with the second server; and transmitting, to the UE, data packets related to the service after transmitting the information related to the connection of the UE with the second server.

Accordingly, embodiments herein disclose another method for providing seamless service continuity in the distributed wireless network system by a third server. The method includes transmitting, to a user equipment (UE), information indicating that the service is available from a second server; receiving, from the UE, information that the UE locates in the service area where the service is provided by both the first server and the second server, in response to receiving, by the UE, the information indicating that the service is available from the second server; and transmitting, to the UE, operational rules of the service area, in response to receiving the information that the UE locates in the service area.

Accordingly, embodiments herein disclose a UE for providing continuity for a service in a wireless communication network system. The UE includes a transceiver; and at least one processor configured to receive, from a first server, data packets related to the service; determine that the UE locates in a service area where the service is provided by both the first server and a second server; establish a connection of the UE with the second server based on determining that the UE locates in the service area; transmit, to the first server, information related to the connection of the UE with the second server; receive, from the first server, information including a notification which indicates a transfer of application context of the service to the second server is completed; switch the connection from the first server to the second server based on receiving the information including the notification; receive, from the first server, end data packets related to the service, in response to switching the connection; and continue the service using the established connection with the second server based on the received end data packets.

Accordingly, embodiments herein disclose a first server for providing continuity for a service in a wireless communication network system. The first server includes transceiver; and at least one processor configured to transmit, to a user equipment (UE), data packets related to the service; receive, from the UE, information related to the connection of the UE with the second server while transmitting the data packets related to the service; transmit, to the UE, information including a notification that indicates a transfer of application context of the service to the second server is completed, in response to receiving the information related to the connection of the UE with the second server; transmit, to the UE, end data packets related to the service in response transmitting the information including the notification; and disconnect a connection of the UE with the first server.

Accordingly, embodiments herein disclose a second server for providing continuity for a service in a wireless communication network system. The second server includes transceiver; and at least one processor configured to receive, from a user equipment (UE), a connection request; transmit, to the UE, a connection response indicating that accepts the connection request is accepted; after a connection of the UE with a first server is switched to a connection of the UE with the second server, transmit, to the first server, information related to the connection of the UE with the second server; and transmit, to the UE, data packets related to the service after transmitting the information related to the connection of the UE with the second server.

Accordingly, embodiments herein disclose a third server for providing continuity for a service in a wireless communication network system. The third server includes transceiver; and at least one processor configured to transmit, to a user equipment (UE), information indicating that the service is available from a second server; receive, from the UE, information that the UE locates in the service area where the service is provided by both the first server and the second server, in response to receiving, by the UE, the information indicating that the service is available from the second server; and transmit, to the UE, operational rules of the service area, in response to receiving the information that the UE locates in the service area.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF DRAWINGS

This method and system are illustrated in the accompanying drawings, throughout which like reference letters indicate corresponding parts in the various figures. The embodiments herein will be better understood from the following description with reference to the drawings, in which:

FIG. 1 illustrate a network architecture of a wireless network system (100) for providing seamless service continuity to UE, according to an embodiment as disclosed herein;

FIGS. 2A and 2B collectively illustrate network environment scenarios of switching of the UE from a first data network to a second data network, according to a prior art;

FIG. 3 illustrates a network environment scenario for transferring the application context during switching of the UE from a cloud data network to an edge data network using overlapping service areas, according to an embodiment as disclosed herein;

FIGS. 4A and 4B illustrate a network environment scenario for transferring the application context during switching of the UE from a second edge data network to a first edge data network using overlapping service areas, according to an embodiment as disclosed herein;

FIG. 5 illustrates a network environment scenario for transferring the application context during switching of the UE from a from a source EDN to a target EDN using overlapping service areas, according to an embodiment as disclosed herein;

FIG. 6 illustrates another network environment scenario for transferring the application context during switching of the UE from the cloud data network to the edge data network using a single overlapping service area, according to the embodiments as disclosed herein;

FIG. 7 illustrates another network scenario for transferring the application context during switching of the UE from a source EDN to a target EDN using single overlapping service areas between the source EDN and the target EDN, according to the embodiments as disclosed herein;

FIGS. 8A and 8B collectively illustrate a sequential diagram representing various steps of a method providing seamless service continuity during switching of the UE from the first EDN to the second EDN, according to embodiments as disclosed herein;

FIG. 9 illustrates a hardware component diagram for the UE, according to embodiments as disclosed herein of;

FIG. 10 illustrates a hardware component diagram for the ECS, according to embodiments as disclosed herein;

FIG. 11 illustrates a hardware component diagram for the EES, according to embodiments as disclosed herein;

FIG. 12 illustrates a hardware component diagram for the EAS, according to embodiments as disclosed herein;

FIGS. 13A and 13B collectively illustrate a flow chart illustrating a method for providing seamless service continuity in the distributed wireless network system (100) during switching of the UE from the first data network to the second data network, according to embodiments as disclosed herein of; and FIG. 14 illustrates another flow chart illustrating a method for providing seamless service continuity in the distributed wireless network system during switching of the UE from the first data network to the second data network, according to embodiments as disclosed herein.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for providing continuity for a service in a wireless communication network system. The method consuming, by a UE, the service from one of a first EAS while the UE is connected with an edge data network, and a cloud AS while the UE is connected with a non-edge cloud data network. Further, the method includes determining, by one of at least one EEC of the UE, a first EES associated with the first EAS, and the first EAS, that a current location of the UE is served by both a second EAS, and one of the first EAS and the cloud AS. The method further includes transferring, by one of the at least one EEC, the first EES, and the first EAS, an application context related to the service to the second EAS based on the determination that the current location of the UE is served by both the second EAS, and one of the first EAS and the cloud EAS. The method further includes establishing, by the UE, a connection of the UE with both the second EAS and a second EES associated with the second EAS, and continuing, by the UE, the service using the established connection with both the second EAS and the second EES.

In an example, in the existing method, whenever the UE switches from a first data network (interchangeably may also be referred as "source data network") to a second data network (interchangeably may also be referred as "target data network"), there is a lack of understanding as to when transfer of application context related to a service used by the UE should be initiated. In the conventional methods there are two possible options which includes a) trigger a transfer of application context before the UE switches to the target data network b) trigger a transfer of the application context after the UE switches to the target data network. However, in both the options it is difficult to determine exactly how much time before switching of the UE to the target data network, the application context transfer should be initiated, or exactly how much time after switching of the UE to the target data network, the transfer of the application context should be initiated. Due to the above mentioned lack of understanding of an initiation time of the transfer of the application context during switching of the UE from the source data network to the target data network, user may experience a noticeable lag or an interruption in the service continuity of the application service used by the UE.

Unlike conventional methods and systems, the proposed method can be used to apply operational rules which should be followed by the UE, the source data network and the target data network during switching of the UE from the source data network to the target data network. The proposed method facilitate deployment of one or more overlapping areas between the source data network and the target data network, and further define certain operational rules respective to each overlapping area of the one or more overlapping areas.

The operational rules guides the UE, the source data network and the target data network for transferring of the application context during switching of the UE from the source data network to the target data network in order to achieve uninterrupted seamless service continuity.

In the proposed methods, the each deployed overlapping area is associated with a set of operational rules which are incorporated within the UE so that the UE along with the source data network make decision on triggering of a transfer of the application context while switching to the target data network without hampering the service continuity related to the application services consumed by the UE. In an alternate embodiment, the set of operation rules can be incorporated within the source data network or the target data network so that the data networks instruct and coordinates the transfer of the application context while the UE moves from the source data network to the target data network.

In an embodiment, the area or location, served by the source data network, the target data network or an overlapping service area between the source data network and the target data network, can be defined as, but not limited to, a geographic area or a list of cell identifiers (IDs) or a list of tracking area identifiers (TAIs) or a list of data network access identifiers (DNAIs) or a combination thereof. In case of cell IDs, tracking area identifiers (TAIs) and a data network access identifiers (DNAIs), the overlapping area can be determined as the list of cell IDs, list of tracking area identifiers (TAIs) and a list of data network access identifiers (DNAIs) common between the source data network and target data networks.

In an embodiment, the service areas are service areas specific to an application and may or may not directly correlate with edge data network areas. The edge computing service provider along with the application provider has the onus of designing the service areas for the applications such that there are overlaps as described in this invention, depending upon the service continuity requirements of the applications.

Referring now to the drawings, and more particularly to FIGS. 1, and 3-14, where similar reference characters denote corresponding features consistently throughout the figures, there are shown preferred embodiments.

FIG. 1 illustrates a network architecture of a wireless network system (100) for providing seamless service continuity to the UE, according to an embodiment of the present invention as disclosed herein. The distributed wireless network system (100) includes a UE (102), a plurality of edge data networks (EDN) (108a-108n), a cloud data network (116), an edge configuration server (ECS) (114), a service provider (122), and a third-generation partnership project (3GPP) network (124). The UE (102) includes an application client (AC) (104), and an edge enabler client (EEC) (106). Each EDN (108a) of the plurality of EDNs (108a-108n) includes one or more edge application servers and an edge enabler server (EES), such as the first EDN (108a) includes a first EAS (110a), another first EAS (110a') and a first EES (112a), the second EDN (108b) includes a second EAS (110b) and a second EES (112b), the third EDN (108c) includes a third EAS (110c and a third EES (112c), and so on. The cloud data network (116) includes a cloud application server (118).

In order to run an application within the UE (102), the AC (104) connects with either the cloud AS (118) or at least one EAS (110a), with the help of the EEC (106), to avail the services of the application hosted by the cloud AS (118) or the at least one EAS (110a). The UE (102) connects either to the cloud data network (116) or the EDN (108a) based on guidelines provided by the ECS (114) as the ECS (114) is the centralized server which has information related to all the data networks within the system (100). The service provider (122) renders the application service related to the application hosted by the data networks such as cloud data network (116) or the EDN (108a-108n) over the internet to the UE (102). The UE (102), the EDN (108a-108n), the cloud data network (116), the service provider (122), and the ECS (116) communicates with each other via the 3GPP network (124).

In an embodiment, the UE (102) can be, for example but not limited to a cellular phone, a tablet, a virtual reality device, a smart phone, a laptop, a personal digital assistant (PDA), a global positioning system, a multimedia device, a video device, an internet of things (IoT) device, and a smart watch. The 3GPP network (104) maintains the communication standard according to protocols defined in the 3rd generation partnership project for mobile telecommunications.

The AC (104) is an application installed in the UE which interacts with respective application servers such as the cloud AS (118), or the EAS (110a) at the EDN (108a) for running the application with edge capabilities in the UE (102). The ECS (114) initially provides the UE (102) with information to connect to a nearest EDN (108) for leveraging edge application services. The functionalities of the ECS (114) includes providing the UE (102) with the service area configurations such that it is clear which service area is overlapping with which service area and explicitly indicate overlapping areas, as first overlapping service area or second overlapping service area. The ECS (114) also provides the operational rules for the overlapping areas to the UE (102), which sets the guidelines to the UE (102) to make the UE (102) aware of steps to be taken while switching from the connected data network (may also be referred as "source data network" or "first data network") to another data network (may also be referred as "target data network" or "second data network") if the UE (102) moves from a service area of the first data network to a service area of the second data network. In an alternate embodiment, such guidelines can be preconfigured in the UE (102), wherein the ECS (114) will not be required to provide them to the UE (102). The ECS (114) can also provide the UE (102) with edge computing service areas details in such a format that the UE (102) can determine the overlapping areas and related rules. In an alternate embodiment, the UE may switch from a service area of one EAS to service area of another EAS within same EDN (108), for example the UE may switch from a service area of the first EAS (110a) to a service area of another first EAS (110a') of the first EDN (108a). The service provider (122) is configured to strategically deploy one or more overlapping service areas within the source data network and the target data network. The service provider (122) determines an appropriate number of overlapping service areas, determining the size of the overlapping service area, to be deployed between data networks, based on amount of data traffic between the data networks, an estimated size of an application context related to the application services hosted by the data networks, a bandwidth requirement of the application services hosted by the data networks, a number of users who have subscribes for the application services hosted by the data networks, and/or the like. In an alternate embodiment, the service provider can plan different overlapping service areas for each EAS (110a, 110a', 110b . . . 110n) running in the EDN (108), based on the specific requirements of the EAS (110a, 110a', 110b . . . 110n). The physical size of these overlapping areas can be fluid and be decided based upon application requirements, such as the minimum time it requires to achieve a meaningful application context synchronization. For example, for certain applications the size of the application context may be large and may require significant time to synchronize between the first EAS (110a) to second EAS (110b), therefore the size of the overlapping area should be large enough so that the synchronization is successful before the UE (102) moves out to an area of the second EAS (110b). The one or more overlapping service areas corresponds to service areas where services are provided by both the first data network and the second data network. Alternatively or additionally, the one or more overlapping service areas corresponds to service areas where service from at least two EASs of same EDN (108) is available, for example, an overlapping area between service areas of the EAS (110a) and the EAS (110a'). In an alternate embodiment, the service area and the overlapping service areas can correspond to the service area of individual EASs (110a, 110b . . . 110n) and the overlap between the service areas of such EASs (110a, 110b . . . 110n). Methods similar to the ones provided in this invention, keeping service area as the service area of data network, can also be applied in such systems. The ECS (114) defines one or more operational rules for each overlapping service area and sends these operational rules as guidelines to the UE (102). It shall be noted that the first data network may be the cloud data network (116) and the second data network may be the EDN (108a) or vice versa. Alternatively, the first data network may be the EDN (108a) and the second data network may be another EDN (108b) from the plurality of EDNs (108a-108n). The UE (102) receives the guidelines from the ECS (114), and accordingly interacts with the EEC (106), the AC (104), and the source data network for transferring an application context related to the application service consumed by the UE (102) while switching from the first data network to the second data network.

The EEC (106) is configured to provide supporting functions needed for the AC (104). The functionalities of the EEC (106) include identifying presence of the UE (102) in the one or more overlapping service area, identifying nearest target data network to the UE (102), and initiating a transfer of the application context during switching of the UE (102) from the first data network to the second data network. The EAS (110) is the application server resident in the EDN (108) to perform the server functions.

In an embodiment, whenever the UE (102) moves from the source data network (may also be referred as "first data network"), from which the UE is currently consuming the application services, to the target data network (may also be referred as "second data network"), which will be nearest data network for the UE (102) in short period of time or which already is the nearest data network for the UE (102), the UE (102) traverses through the one or more overlapping service areas. Accordingly, during the switching of the UE (102) from the source data network to the target data network, the UE (102) is configured to determine a presence of the UE (102) within the one or more overlapping service areas. The presence of the UE (102) within the one or more overlapping service areas is determined based on a current location of the UE (102), where the UE receives the application service from both the first data network and the second data network. Based on the determination that the UE (102) is present in the one or more overlapping service areas, the UE (102) implements the guidelines associated with the respective overlapping service area. The UE (102) further informs the respective source server such as the first EES (112a) to initiate the transfer of the application context to the target data network according to the guidelines. In an embodiment, the area or location, served by the data networks (116 or 108), or an overlapping service area between data networks (116 or 108), can be defined as, but not limited to, a geographic area or a list of cell identifiers (IDs) or a list of tracking area identifiers (TAIs) or a list of data network access identifiers (DNAIs) or a combination thereof. In case of cell IDs, tracking area identifiers (TAIs) and a data network access identifiers (DNAIs), the overlapping area can be determined as the list of cell IDs, list of tracking area identifiers (TAIs) and a list of data network access identifiers (DNAIs) common between the target data networks (116 or 108).

In an embodiment, the service areas are service areas specific to an application and may or may not directly correlate with data network areas. The service provider (122) along with application provider has the onus of designing the service areas for the applications such that there are overlaps as described in this invention, depending upon the service continuity requirements of the applications. Further, it shall be noted that only one UE (102), one service provider (122), one cloud data network (116) are shown in the FIG. 1 for the sake of brevity, however it will be apparent to a person having ordinary skills in the art that more than one UE (102), one service provider (122), one cloud data network (116) can also be present in the system (100).

In an alternate embodiment, the UE (102) moves from the service area of EAS (110a), from which the UE is currently consuming the application services, to the service area of the EAS (110a'), which will be nearest EAS for the UE (102) in short period of time or which already is the nearest EAS for the UE (102), the UE (102) traverses through the one or more overlapping service areas. Accordingly, during the switching of the UE (102) from the service area of EAS (110a) to the service area of the EAS (110a'), the UE (102) is configured to determine a presence of the UE (102) within the one or more overlapping service areas. The presence of the UE (102) within the one or more overlapping service areas is determined based on the current location of the UE (102), where the UE receives the application service from both the EAS (110a) and the EAS (110a'). Based on the determination that the UE (102) is present in the one or more overlapping service areas, the UE (102) implements the guidelines associated with the respective overlapping service area. The UE (102) further informs the respective source server such as the first EDN (110a) to initiate the transfer of the application context to the EAS (110a') according to the guidelines.

Further, different steps involved in implementation of the guidelines including the operational rules associated with each overlapping service area during switching of the UE (102) from the source data network to the target data network for providing seamless service continuity are explained in detail in the FIGS. 3-14. Further, the shortcomings in the existing systems due to lack of understanding of initiation time of the capture or the transfer of the application context during switching of the UE (102) from the source data network to the target data network are further explained in the FIGS. 2A and 2B. The capture of the application context means that data related to the application context is gathered and made ready for transferring for example, by packaging the data related to the application context into a specific format for transferring.

FIGS. 2A and 2B illustrate network environment scenarios (200) and (210) of switching of the UE (102) from the first data network to the second data network, according to a prior art.

The first data network and the second data network can be the cloud data network (116) or the edge data network (108). The UE (102) is moving from a service area (202) of the first data network towards a service area (204) of the second data network, according the first data network is considered as a source data network and the second data network is considered as the target data network. The service area (202) may also be referred as "source service area (202)" hereinafter. The service area (204) may also be referred as "target service area (204)" hereinafter.

In conventional methods, two options are considered for initiating the capture and the transfer of the application context during switching of the UE (102) from the source service area (402) to the target service area (204). Option 1 in which the capture and the transfer of the application context is initiated when the UE is about to move to the target service area (204). Option 2 in which the capture and the transfer of the application context is initiated after the UE has moved to the target service area (204).

FIG. 2A depicts a scenario (200) explained in the option 1 whereas FIG. 2B depicts a scenario (210) explained in the option 2. Both the options, option 1 and option 2, will provide similar service experience as both options have the several issues which are a) a lack of understanding of when exactly to freeze the application context, because for seamless service continuity, the application context needs to be available at a target application server of the target data network before the UE (102) switches to the target service area (204).

If the capture and the transfer of the application context is initiated just before the AC (104) switches from a source application server of the source data network to the target application server, there still is uncertainty regarding the exact time to initiate the application context capture and the transfer, and what happens to the service while the context is being transferred while considering a size of the application context can be large for certain applications.

Further, if the capture and the transfer of the application context is initiated much before the AC (104) switches from the source application server to the target application server, there still is uncertainty regarding a) the exact time to initiate the application context capture and the transfer, b) whether the service continues after the application context is captured, or c) whether the captured context is updated at the source application server or not.

Similarly, if the application context is captured and transferred just after the AC (104) switches from the source application server to the target application server, there still is uncertainty regarding whether the service continues at the source application server after the application context is transferred, how does the source application server knows the AC (104) is switching, and if any delay is incurred or not, and how the delay incurred is handled because it is important to handle the delay properly if the size of the application context is large.

With the above set of issues, service continuity will have a noticeable lag in service, or in worst case, a service interruption may occur. For certain types of applications which require high reliability and uninterrupted service, above listed option will fail to provide service continuity.

Accordingly, the proposed solution in the present invention overcomes the above mentioned issues in the conventional method, and solves the problem of service lag or service interruption during switching of the UE (102) from the source data network to the target data network.

FIG. 3 illustrates a network environment scenario (300) for transferring the application context during switching of the UE from a cloud data network (116) to the first EDN (108a) using overlapping service areas, according to an embodiment as disclosed herein.

As shown in the FIG. 3, there are a non-overlapped service area (302) of the first EDN (108a), a non-overlapped service area (304) of the cloud data network (116), and two overlapping service areas (306 and 308) where service from both the cloud data network (116) and the first EDN (108a) is available.

In an embodiment, the UE (102) moves from the cloud data network (116) towards the first EDN (108a), which means the source data network of the UE (102) is the cloud data network (116) and the target data network of the UE (102) is the first EDN (108a). While moving from the cloud data network (116) towards the first EDN (108a), the UE (102) first enters into a first overlapping service area (304). The UE (102) determines that the current location of the UE (102) is changed from the non-overlapped service area (304) of the cloud data network (116) to the first overlapping service area (306). The UE (102) may obtain inputs from a GPS unit of the UE (102) or a modem unit of the UE (102). In an alternate embodiment, the cloud AS (118) of the cloud data network (116) may also determine a presence of the UE (102) in the first overlapping service area (306) based on determining that UE (102) is present in a first location where the application service from both the cloud data network (116) and the first EDN (108a) is available. Based on the determination of the presence of the UE (102) in the first overlapping service area (306), the UE (102) executes one or more operational rules associated with the first overlapping service area (306) as received from the ECS (114). In an embodiment, the one or more operational rules associated with the first overlapping service area (306) are a) establishing a connection of the EEC (106) with the first EES (112a), while the AC (104) is connected to the cloud AS (118), and b) initiating a capture of the application context of the application service running at the UE (102) for transferring the application context to the target application server which is the first EAS (110a) of the first EDN (108a). In other words, the UE (102) requests, to the cloud data network (116), for capturing the application context of the application service running at the UE (102), in order to transfer the captured application context from the cloud data network (116) to the first EAS (110a) of the first EDN (108a).

In an embodiment, the UE (102) further moves from the first overlapping service area (306) to a second overlapping service area (308). The UE (102) determines that the current location of the UE (102) has changed from the first overlapping service area (306) to the second overlapping service area (308) based on determining that UE (102) is present in a second location where the application service from both the cloud data network (116) and the first EDN (108a) is available. In an alternate embodiment, the cloud AS (118) of the cloud data network (116) may also determine the presence of the UE (102) in the second overlapping service area (308). Based on the determination of the presence of the UE (102) in the second overlapping service area (308), the UE (102) executes one or more operational rules associated with the second overlapping service area (308) as received from the ECS (114). In an embodiment, the one or more operational rules associated with the second overlapping service area (308) are: a) maintaining the established connection of the EEC (106) with the first EES (112a), b) establishing a connection of the AC (104) with the first EAS (110a), and c) initiating a transfer of the application context of the application service running at the UE (102) to the target application server which is the first EAS (110a) of the first EDN (108a). In other words, the UE (102) requests, to the cloud data network (116), for transferring the captured application context to the first EAS (110a) of the first EDN (108a).

When the UE (102) enters the non-overlapped service area (302) of the EDN (108a) from the second overlapping service area (308), the UE (102) gets switched from the cloud data network (116) to the first EDN (108a) and the first EAS (110a) has received the application context required to seamlessly resume the application service running at the UE (102) hence providing a seamless service continuity experience to the user. Further, when the UE (102) switched to the first EDN (108a), the first EES (112a) sends a message to the cloud data network (116) regarding establishment of a connection of the UE (102) with the first EDN (108a), and accordingly the cloud AS (118) sends end data packets or end marker packet related to the application service to the AC (104), and disconnects with the AC (104) of the UE (102). The UE (102) continues availing the application service from the first EAS (110a).

FIG. 4A illustrates a network environment scenario (400) for transferring the application context during switching of the UE from the second EDN (108b) to the first EDN (108a) using overlapping service areas, according to an embodiment as disclosed herein.

As shown in the FIG. 4A, there are a non-overlapped service area (402) of the first EDN (108a), a non-overlapped service area (404) of the second EDN (108b), and two overlapping service areas (406 and 408), where service from both the first cloud data network and the EDN (108a) is available.

In an embodiment, the UE (102) moves from the second EDN (108b) towards the first EDN (108a), which means the source data network of the UE (102) is the second EDN (108b) and the target data network of the UE (102) is the first EDN (108a). While moving from the second EDN (108b) towards the first EDN (108a), the UE (102) first enters into a first overlapping service area (406). The UE (102) determines that the current location of the UE (102) is changed from the non-overlapped service area (404) of the second EDN (108b) to the first overlapping service area (406) based on determining that UE (102) is present in a first location where the application service from both the cloud data network (116) and the edge data network (108a) is available. In an alternate embodiment, the second EES (112b) or the second EAS (110b) of the second EDN (108b) may also determine a presence of the UE (102) in the first overlapping service area (406). Based on the determination of the presence of the UE (102) in the first overlapping service area (406), the UE (102) executes one or more operational rules associated with the first overlapping service area (406) as received from the ECS (114). According to an embodiment, the one or more operational rules associated with the first overlapping service area (406) are a) establishing a connection of the EEC (106) with the first EES (112a) of the first EDN (108a) along with already established connection with the second EES (112b) of the second EDN (108b), while the AC (104) is connected to the second EAS (110b) of the second EDN (108b), and b) initiating a capture of the application context of the application service running at the UE (102) for transferring the application context to the first EAS (110a) of the EDN (108a). In other words, the UE (102) requests, to the first EAS (110a'), for capturing the application context of the application service running at the UE (102), in order to transfer the captured application context from the second EAS (110b) of the second EDN (108b) to the first EAS (110a) of the first EDN (108a).

In the first overlapping service area (406) a quality of service (QoS) of the application service provided by the second EAS (110b) of the second EDN (108b) is better than a QoS of the application service provided by the first EAS (110a) of the first EDN (108a). It shall be noted that various factors may be responsible for the better QoS of the application service by the second EAS (110b) of the second EDN (108b) in the first overlapping service area (406), for example, but not limited to, a proximity distance between the UE (102) and the second EDN (108b) is lesser than a proximity distance between the UE (102) and the first EDN (108a) in the first overlapping service area (406), a data transmission rate provided by the second EDN (108b) is greater than a data transmission rate of the first EDN (108a) in the first overlapping service area (406), a signal to noise ratio (SNR) of the second EDN (108b) is less than a SNR of the first EDN (108a) in the first overlapping service area (406), a network topology of the second EDN (108b) is capable of providing better service than the network topology of the first EDN (108a) in the first overlapping service area (406).

In an embodiment, the UE (102) further moves from the first overlapping service area (406) to a second overlapping service area (408). The UE (102) determines that the current location of the UE (102) has changed from the first overlapping service area (406) to the second overlapping service area (408) based on determining that UE (102) is present in a second location where the application service from both the cloud data network (116) and the edge data network (108a) is available. In an alternate embodiment, the second EES (112b) or the second EAS (110b) may also determine a presence of the UE (102) in the second overlapping service area (408). Based on the determination of the presence of the UE (102) in the second overlapping service area (408), the UE (102) executes one or more operational rules associated with the second overlapping service area (408) as received from the ECS (114). According to an embodiment, the one or more operational rules associated with the second overlapping service area (408) are: a) maintaining the established connection of the EEC (106) with the first EES (112a) along with already established connection with the second EES (112b), b) establishing a connection of the AC (104) with the first EAS (110a), and c) initiating a transfer of the application context of the application service running at the UE (102) to the first EAS (110a) of the EDN (108a). In other words, the UE (102) requests, to the second EAS (110b), for transferring the captured application context of the application service running at the UE (102) to the first EAS (110a) of the EDN (108a).

In the second overlapping service area (408) the QoS of the application service provided by the first EAS (110a) of the first EDN (108a) is better than the QoS of the application service provided by the second EAS (110b) of the second EDN (108b). It shall be noted that various factors may be responsible for the better QoS of the application service by the first EAS (110a) of the first EDN (108a) in the second overlapping service area (408), for example, but not limited to, the proximity distance between the UE (102) and the first EDN (108a) is lesser than the proximity distance between the UE (102) and the second EDN (108b) in the second overlapping service area (408), the data transmission rate provided by the first EDN (108a) is greater than the data transmission rate of the second EDN (108b) in the second overlapping service area (408), the SNR of the first EDN (108a) is less than the SNR of the second EDN (108b) in the second overlapping service area (408), the network topology of the first EDN (108a) is capable of providing better service than the network topology of the second EDN (108b) in the second overlapping service area (408).

When the UE (102) enters the non-overlapped service area (402) of the EDN (108a) from the second overlapping service area (408), the UE (102) gets switched from the second EDN (108b) to the first EDN (108a) and the first EAS (110a) has received the application context required to seamlessly resume the application service running at the UE (102) hence providing a seamless service continuity experience to the user. Further, when the UE (102) switched to the first EDN (108a), the first EES (112a) sends a message to the second EDN (108b) regarding an establishment of a connection of the UE (102) with the first EDN (108a), and accordingly the second EAS (110b) sends end data packets or end marker packet related to the application service to the AC (104), and disconnects with the AC (104) of the UE (102). The UE (102) continues availing the application service from the first EAS (110a).

The process of transferring of the application context from the source data network to the target data network should be a continuous process while the UE (102) is in an overlapping area, i.e., any changes at the source application server (the application server with which the AC (104) is connected) should be reflected in the target application server immediately. There can be numerous ways to do that, such as:

The source application server can mimic or forward the requests from the AC (104) towards the target application server and purge the responses from the target application server.

The AC (104) can connect to either the cloud AS (118), or the EASs (110a, 110b . . . 110n), and duplicates the requests, while handling the responses from the source application server (decided based on the operational rules associated with the overlapping service area).

The source application server may correspond to one of the cloud AS (118), or the EASs (110a, 110b . . . 110n), and the target application server may also correspond to one of the cloud AS (118), or the EASs (110a, 110b . . . 110n), however the source application server should be different server than the target application server.

FIG. 4B illustrates a network environment scenario (420) for transferring the application context during switching of the UE from service area of first EAS (110a') to the service area of first EAS (110a) using overlapping service areas, according to an embodiment as disclosed herein.

As shown in the FIG. 4A, there are a non-overlapped service area (410) of the first EAS (110a), a non-overlapped service area (416) of the first EAS (110a'), and two overlapping service areas (412 and 414), where service from both the first EAS (110a) and the first EAS (110a') of the first EDN (108a) is available. As the UE is moving from the first EAS (110a') to the first EAS (110a), the first EAS (110a') is the source EAS (110a') and the first EAS (110a) is the target EAS. Therefore, the first EAS (110a') may also be referred as "source EAS (110a')," and the first EAS (110a) may also be referred as "target EAS (110a)."

In an embodiment, the UE (102) moves from the source EAS (110a') towards the target EAS (110a). While moving from the source EAS (110a') towards the target EAS (110a), the UE (102) first enters into a first overlapping service area (412). The UE (102) determines that the current location of the UE (102) is changed from the non-overlapped service area (416) of the source EAS (110a') to the first overlapping service area (412) based on determining that UE (102) is present in a first location where the application service from both the source EAS (110a') and the target EAS (110a) is available. In an alternate embodiment, the EES (112a) may also determine a presence of the UE (102) in the first overlapping service area (412). Based on the determination of the presence of the UE (102) in the first overlapping service area (412), the UE (102) executes one or more operational rules associated with the first overlapping service area (412) as received from the ECS (114). According to an embodiment, the one or more operational rules associated with the first overlapping service area (412) are a) maintaining a connection of the AC (104) with the source EAS (110a'), and b) initiating a capture of the application context of the application service running at the UE (102) for transferring the application context to the target EAS (110a). In other words, the UE (102) requests, to the first EAS (110a') for capturing for capturing the application context of the application service running at the UE (102), in order to transfer the captured application context from the first EAS (110a') to the first EAS (110a).

In the first overlapping service area (412), a quality of service (QoS) of the application service provided by the source EAS (110a') is better than a QoS of the application service provided by the target EAS (110a).

In an embodiment, the UE (102) further moves from the first overlapping service area (412) to a second overlapping service area (414). The UE (102) determines that the current location of the UE (102) has changed from the first overlapping service area (412) to the second overlapping service area (414) based on determining that UE (102) is present in a second location where the application service from both the target EAS (110a) and the source EAS (110a') is available. Based on the determination of the presence of the UE (102) in the second overlapping service area (414), the UE (102) executes one or more operational rules associated with the second overlapping service area (414) as received from the ECS (114). According to an embodiment, the one or more operational rules associated with the second overlapping service area (414) are: a) establishing a connection of the AC (104) with the target EAS (110a), and b) initiating a transfer of the application context of the application service running at the UE (102) to the target EAS (110a). In other words, The UE (102) requests, to the first EAS (110a'), for transferring the captured application context to the first EAS (110a).

In the second overlapping service area (414) the QoS of the application service provided by the target EAS (110a) is better than the QoS of the application service provided by the source EAS (110a'). It shall be noted that various factors may be responsible for the better QoS of the application service by the target EAS (110a) in the second overlapping service area (414), for example, but not limited to, the proximity distance between the UE (102) and the target EAS (110a) is lesser than the proximity distance between the UE (102) and the source EAS (110a') in the second overlapping service area (414), the data transmission rate provided by the target EAS (110a) is greater than the data transmission rate of the source EAS (110a') in the second overlapping service area (414), the SNR of the target EAS (110a) is less than the SNR of the source EAS (110a') in the second overlapping service area (414), the network topology of the target EAS (110a) is capable of providing better service than the network topology of the source EAS (110a') in the second overlapping service area (414).

When the UE (102) enters the non-overlapped service area (410) of the target EAS (110a) from the second overlapping service area (414), the UE (102) gets switched from the source EAS (110a') to the target EAS (110a), and the target EAS (110a) has received the application context required to seamlessly resume the application service running at the UE (102) hence providing a seamless service continuity experience to the user. Further, when the UE (102) switched to the target EAS (110a), the first EES (112a) sends a message to the source EAS (110a') regarding an establishment of a connection of the UE (102) with the target EAS (110a), and accordingly the source EAS (110a') sends end data packets or end marker packet to the AC (104), and disconnects with the AC (104) of the UE (102). The UE (102) continues availing the application service from the target EAS (110a).

FIG. 5 illustrates a network environment scenario (500) for transferring the application context during switching of the UE from a source EDN to a target EDN using overlapping service areas, according to an embodiment as disclosed herein.

As shown in the FIG. 5, there are three edge data networks the first EDN (108a), the second EDN (108b), and the third EDN (108c). Accordingly, if the UE (102) moves from the third EDN (108c) towards the first EDN (108a), then the third EDN (108c) is considered as the source EDN and the first EDN (108a) is considered as the target EDN. Similarly, if the UE (102) moves from the second EDN (108b) towards the first EDN (108a) then the second EDN (108b) is considered as the source EDN and the first EDN (108a) is considered as the target EDN. Accordingly, each of the first EDN (108a), the second EDN (108b), and the third EDN (108c) can be considered as the source EDN or the target EDN based on a connectivity with the UE (102).

FIG. 5 shows a non-overlapped service area (502) of the first EDN (108a), a non-overlapped service area (504) of the second EDN (108b), a non-overlapped service area (506) of the third EDN (108c), a first overlapping service area (508) and a second overlapping service area (510), a third overlapping service area (512) and a fourth overlapping service area (514), a fifth overlapping service area (516) and a sixth overlapping service area (518), and seventh overlapping service area (520). In the first overlapping service area (508) and the second overlapping service area (510), the application service is available from both the first EDN (108a) and the third EDN (108c). In the third overlapping service area (512) and the fourth overlapping service area (514), the application service is available from both the first EDN (108a) and the second EDN (108b). In the fifth overlapping service area (516) and the sixth overlapping service area (518), the application service is available from both the third EDN (108c) and the second EDN (108b). In the seventh overlapping service area (520), the application service is available from the first EDN (108a), the second EDN (108b) and the third EDN (108c).

In an embodiment, the UE (102) moves from the service area (506) of the third EDN (108c) towards the service area (502) of the first EDN (108a). While moving from the service area (506) of the third EDN (108c) towards the service area (502) of the first EDN (108a), the UE (102) first enters into the first overlapping service area (508). The EEC (106) or the AC (104) of the UE (102) determines that the current location of the UE (102) is changed from the non-overlapped service area (506) of the third EDN (108c) to the first overlapping service area (508). The AC (104) may obtain inputs from the GPS unit of the UE (102) or the EEC (106) of the UE (102) obtain inputs from the modem unit of the UE (102). The AC (104) of the UE (102) keeps track of a GPS location and the EEC (106) of the UE (102) keeps track if the modem inputs along with the GPS location. The EEC (106) of the UE (102) may use telephony APIs to obtain a cell ID or tracking area ID etc. In an alternate embodiment, the third EAS (110c) of the third EDN (108c) may also determine a presence of the UE (102) in the first overlapping service area (508). Based on the determination of the presence of the UE (102) in the first overlapping service area (508), the UE (102) executes one or more operational rules associated with the first overlapping service area (508) as received from one of the ECS (114), the third EDN (108c) or may be pre-configured in the UE (102). In an embodiment, the one or more operational rules associated with the overlapping service area (508) are a) establishing a connection between the EEC (106) and the first EES (112a) of the first EDN (108a) in addition to the already established connection of the EEC (106) with the third EES (112c) of the third EDN (108c), while the AC (104) is connected to the third EAS (110c) of the third EDN (108c), and b) initiating a capture of the application context of the application service running at the UE (102) for transferring the application context to the first EAS (110a) of the first EDN (108a).

In an embodiment, the UE (102) further moves from the first overlapping service area (508) to the second overlapping service area (510). The EEC (106) or the AC (104) of the UE (102) determines that the current location of the UE (102) has changed from the first overlapping service area (508) to the second overlapping service area (510). In an alternate embodiment, the third EAS (110c) of the third EDN (108c) may also determine a presence of the UE (102) in the second overlapping service area (510). Based on the determination of presence of the UE (102) in the second overlapping service area (510), the UE (102) executes one or more operational rules associated with the second overlapping service area (510) as received from the ECS (114), the third EDN (108c) or may be pre-configured in the UE (102). In an embodiment, the one or more operational rules associated with the second overlapping service area (510) are: a) maintaining the established connection of the EEC (106) with the first EES (112a) of the first EDN (108a) along with already established connection with the third EES (112c) of the third EDN (108c), b) establishing a connection of the AC (104) with the first EAS (110a), and c) initiating a transfer of the captured application context of the application service running at the UE (102) to the first EAS (110a) of the first EDN (108a).

When the UE (102) enters the non-overlapped service area (502) of the first EDN (108a) from the second overlapping service area (510), the UE (102) gets switched from the third EDN (108c) to the first EDN (108a) and the first EAS (110a) has received the application context required to seamlessly resume the application service running at the UE (102) hence providing a seamless service continuity experience to the user. Further, when the UE (102) switched to the first EDN (108a), the first EES (112a) sends a message to the third EDN (108c) regarding an establishment of a connection of the UE (102) with the first EDN (108a), and in response to the message, the third EDN (108c) sends end data packets or end marker packet related to the application service to the AC (104), and disconnects with the AC (104) of the UE (102). The UE (102) continues availing the application service from the first EAS (110a).

In another embodiment, the UE (102) moves from the service area (504) of the second EDN (108b) towards the service area (502) of the first EDN (108a). While moving from the service area (504) of the second EDN (108b) towards the service area (502) of the first EDN (108a), the UE (102) first enters into the third overlapping service area (512). The EEC (106) or the AC (104) of the UE (102) determines that the current location of the UE (102) is changed from the non-overlapped service area (504) of the second EDN (108*b*) to the third overlapping service area (512). In an alternate embodiment, the second EAS (110*b*) of the second EDN (108*b*) may also determine a presence of the UE (102) in the third overlapping service area (512). Based on the determination of the presence of the UE (102) in the third overlapping service area (512), the UE (102) executes one or more operational rules associated with the third overlapping service area (512) as received from the ECS (114), the second EDN (108*b*), or may be pre-configured in the UE (102). In an embodiment, the one or more operational rules associated with the third overlapping service area (512) are: a) establishing a connection between the EEC (106) and the first EES (112*a*) in addition to the already established connection of the EEC (106) with the second EES (112*b*), while the AC (104) is connected to the second EAS (110*b*) of the second EDN (108*b*), and b) initiating a capture of the application context of the application service running at the UE (102) for transferring the application context to the first EAS (110*a*) of the first EDN (108*a*).

The UE (102) further moves from the third overlapping service area (512) to the fourth overlapping service area (514). The EEC (106) or the AC (104) of the UE (102) determines that the current location of the UE (102) has changed from the third overlapping service area (512) to the fourth overlapping service area (514). In an alternate embodiment, the second EAS (110*b*) or the second EES (112*b*) of the second EDN (108*b*) may also determine the presence of the UE (102) in the fourth overlapping service area (514). Based on the determination of the presence of the UE (102) in the fourth overlapping service area (514), the UE (102) executes one or more operational rules associated with the fourth overlapping service area (514). According to an embodiment, the one or more operational rules associated with the fourth overlapping service area (514) are: a) maintaining the established connection of the EEC (106) with the first EES (112*a*) along with the already established connection with the second EES (112*b*), b) establishing a connection of the AC (104) with the first EAS (110*a*), and c) initiating a transfer of the application context of the application service running at the UE (102) to the first EAS (110*a*) of the first EDN (108*a*).

When the UE (102) enters the non-overlapped service area (502) of the first EDN (108*a*) from the fourth overlapping service area (514), the UE (102) gets switched from the second EDN (108*b*) (may also be referred as "source EDN (108*b*)") to the first EDN (108*a*) (may also be referred as "target EDN (108*a*)"). The first EAS (110*a*) has received the application context required to seamlessly resume the application service running at the UE (102) hence providing a seamless service continuity experience to the user. Further, when the UE (102) switched to the first EDN (108*a*), the first EES (112*a*) sends a message to the second EDN (108*b*) regarding an establishment of a connection of the UE (102) with the first EDN (108*a*), and in response to the message, the second EDN (108*b*) sends end data packets or end marker packet related to the application service to the AC (104), and disconnects with the AC (104) of the UE (102). The UE (102) continues availing the application service from the first EAS (110*a*).

In another embodiment, the UE (102) moves from the service area (504) of the second EDN (108*b*) towards the service area (506) of the third EDN (108*c*). While moving from the service area (504) of the second EDN (108*b*) towards the service area (506) of the third EDN (108*c*), the UE (102) first enters into the fifth overlapping service area (516). The EEC (106) or the AC (104) of the UE (102) determines that the current location of the UE (102) is changed from the non-overlapped service area (504) of the second EDN (108*b*) to the fifth overlapping service area (516). In an alternate embodiment, the second EAS (110*b*) of the second EDN (108*b*) may also determine a presence of the UE (102) in the fifth overlapping service area (516). Based on the determination of the presence of the UE (102) in the fifth overlapping service area (516), the UE (102) executes one or more operational rules associated with the fifth overlapping service area (516). According to an embodiment, the one or more operational rules associated with the fifth overlapping service area (516) are: a) establishing a connection between the EEC (106) and the third EES (112*c*) in addition to the already established connection of the EEC (106) with the second EES (112*b*), while the AC (104) is connected to the EAS (110*b*) of the second EDN (108*b*), and b) initiating a capture of the application context of the application service running at the UE (102) for transferring the application context to the third EAS (110*c*) of the third EDN (108*c*).

The UE (102) further moves from the fifth overlapping service area (516) to the sixth overlapping service area (518). The EEC (106) or the AC (104) of the UE (102) determines that the current location of the UE (102) has changed from the fifth overlapping service area (516) to the sixth overlapping service area (518). In an alternate embodiment, the second EAS (110*b*) of the second EDN (108*b*) may also determine the presence of the UE (102) in the sixth overlapping service area (518). Based on the determination of the presence of the UE (102) in the sixth overlapping service area (518), the UE (102) executes one or more operational rules associated with the sixth overlapping service area (518). According to an embodiment, the one or more operational rules associated with the sixth overlapping service area (518) are: a) maintaining the established connection of the EEC (106) with the third EES (112*c*) along with the already established connection with the second EES (112*b*), b) establishing a connection of the AC (104) with the third EAS (110*c*), and c) initiating a transfer of the captured application context of the application service running at the UE (102) to the third EAS (110*c*) of the third EDN (108*c*).

When the UE (102) enters the non-overlapped service area (506) of the third EDN (108*c*) from the sixth overlapping service area (518), the UE (102) gets switched from the second EDN (108*b*) (may also be referred as "source EDN (108*b*)") to the third EDN (108*c*) (may also be referred as "target EDN (108*c*)"). The third EAS (110*c*) has received the application context required to seamlessly resume the application service running at the UE (102) hence providing a seamless service continuity experience to the user. Further, when the UE (102) switched to the third EDN (108*c*), the third EES (112*c*) sends a message to the second EDN (108*b*) regarding establishment of a connection of the UE (102) with the third t EDN (108*c*), and in response to the message, the second EDN (108*b*) sends end data packets or end marker packet related to the application service to the AC (104), and disconnects with the AC (104) of the UE (102). The UE (102) continues availing the application service from the third EAS (110*c*).

In another embodiment, when the UE (102) is present in the seventh overlapping service area (520), the UE executes the one or more operational rules associated with the seventh overlapping service area (520) which are: a) connecting the EEC (106) with the first EES (112*a*), the second EES (112*b*) and the third EES (112*c*), b) determining whether the UE (102) came from the first overlapping service area (508), and upon the determination on maintaining a connection of the AC (104) with the third EAS (110*c*) and initiating a capture and a transfer of the application context with both the first EAS (110*a*) and the second EAS (110*b*), c) determining whether the UE (102) came from the second overlapping service area (510), and upon the determination on maintaining a connection of the AC (104) with the first EAS (110*a*) and initiating a capture and a transfer of the application context with both the second EAS (110*b*) and the third EAS (110*c*), d) determining whether the UE (102) came from the third overlapping service area (512), and upon the determination on maintaining a connection of the AC (104) with the second EAS (110*b*) and initiating a capture and a transfer of the application context with both the third EAS (110*c*) and the first EAS (110*a*), e) determining whether the UE (102) came from the fourth overlapping service area (514), and upon the determination on maintaining a connection of the AC (104) with the first EAS (110*a*) and initiating a capture and a transfer of the application context with both the second EAS (110*b*) and the third EAS (110*c*), f) determining whether the UE (102) came from the fifth overlapping service area (516), and upon the determination on maintaining a connection of the AC (104) with the second EAS (110*b*) and initiating a capture and a transfer of the application context with both the first EAS (110*a*) and the third EAS (110*c*), and g) determining whether the UE (102) came from the sixth overlapping service area (514), and upon the determination on maintaining a connection of the AC (104) with the third EAS (110*c*) and initiating a capture and a transfer of the application context with both the first EAS (110*a*) and the second EAS (110*b*). Further, when the UE (102) moves to any of the non-overlapped areas (502) of the first EDN (108*a*), the non-overlapped areas (504) of the second EDN (108*b*) or the non-overlapped areas (506) of the third EDN (108*c*), the target EAS of the target EDN corresponding to the non-overlapped areas which the UE moves has received the application context related to the application service running in the UE (102) to seamlessly resume the application service hence providing a seamless service continuity experience to the user.

It shall be noted that the two overlapping service areas between two edge data networks (108), or between the cloud data network (116) and the edge data network (108) are shown just for illustration purpose, and a person having ordinary skills in the art would understand the less than or more than two overlapping service areas can also be deployed between two edge data networks (108), or between the cloud data network (116) and the edge data network (108). Illustrative example of switching of UE (102) between data networks having single overlapping service areas is shown in FIGS. 6 and 7.

FIG. 6 illustrates another network environment scenario (600) for transferring the application context during switching of the UE from the cloud data network (116) to the first EDN (108*a*) using a single overlapping service area, according to an embodiment as disclosed herein.

As shown in the FIG. 6, there are a non-overlapped service area (602) of the first EDN (108*a*), a non-overlapped service area (606) of the cloud data network (116), and an overlapping service areas (604) where service from both the cloud data network (116) and the first EDN (108*a*) is available.

In an embodiment, the UE (102) moves from the service area (606) of the cloud data network (116) towards the service area (602) of the first EDN (108*a*), which means the source data network of the UE (102) is the cloud data network (116) and the target data network of the UE (102) is the first EDN (108*a*). While moving from the cloud data network (116) towards the first EDN (108*a*), the UE (102) enters into the overlapping service area (604). The UE (102) determines that the current location of the UE (102) is changed from the non-overlapped service area (606) of the cloud data network (116) to the overlapping service area (604). In an alternate embodiment, the cloud AS (118) of the cloud data network (116) may also determine a presence of the UE (102) in the overlapping service area (604). Based on the determination of the presence of the UE (102) in the overlapping service area (604), the UE (102) executes one or more operational rules associated with the overlapping service area (604) as received from the ECS (114). According to an embodiment, the one or more operational rules associated with the overlapping service area (604) are: a) establishing a connection of the EEC (106) with the first EES (112*a*) while the AC (104) is connected with the cloud AS (118), b) establishing a connection of the AC (104) with the first EAS (110*a*) while maintaining the connection of the AC (104) with the cloud AS (118), and b) initiating a capture and a transfer of the application context of the application service running at the UE (102) for transferring the application context to the target application server which is the first EAS (110*a*) of the first EDN (108*a*). In other words, the UE (102) requests, to the cloud AS (110), for capturing the application context of the application service running at the UE (102) and transferring the captured application context to the first EAS (110*a*) of the first EDN (108*a*).

When the UE (102) enters the non-overlapped service area (602) of the first EDN (108*a*) from the overlapping service area (604), the UE (102) gets switched from the cloud data network (116) to the first EDN (108*a*) and the first EAS (110*a*) has received the application context required to seamlessly resume the application service running at the UE (102) hence providing a seamless service continuity experience to the user. Further, when the UE (102) switched to the EDN (108*a*), the first EES (112*a*) sends a message to the cloud data network (116) regarding establishment of a connection of the UE (102) with the first EDN (108*a*), and accordingly the cloud AS (118) sends end data packets or end marker packet related to the application service to the AC (104), and disconnects with the AC (104) of the UE (102). The UE (102) continues availing the application service from the first EAS (110*a*).

FIG. 7 illustrates a network environment scenario (700) for transferring the application context during switching of the UE from a source EDN to a target EDN using single overlapping service areas between the source EDN and the target EDN, according to an embodiment as disclosed herein.

As shown in the FIG. 7, there are three edge data networks the first EDN (108*a*), the second EDN (108*b*), and the third EDN (108*c*). Accordingly, if the UE (102) moves from the third EDN (108*c*) towards the first EDN (108*a*), then the third EDN (108*c*) is considered as the source EDN and the first EDN (108*a*) is considered as the target EDN. Similarly, if the UE (102) moves from the second EDN (108*b*) towards the first EDN (108*a*), then the second EDN (108*b*) is considered as the source EDN and the first EDN (108*a*) is considered as the target EDN. Accordingly, each of the first EDN (108*a*), the second EDN (108*b*), and the third EDN (108*c*) can be considered as the source EDN or the target EDN based on a connectivity with the UE (102).

FIG. 7 shows a non-overlapped service area (702) of the first EDN (108*a*), a non-overlapped service area (704) of the second EDN (108*b*), a non-overlapped service area (706) of the third EDN (108c), a first overlapping service area (708), a second overlapping service area (710), a third overlapping service area (712) and a fourth overlapping service area (714). In the first overlapping service area (708), the application service is available from both the first EDN (108a) and the second EDN (108b). In the second overlapping service area (710), the application service is available from both the third EDN (108c) and the second EDN (108b). In the third overlapping service area (712), the application service is available from both the third EDN (108c) and the first EDN (108a). In the fourth overlapping service area (714), the application service is available from the first EDN (108a), the second EDN (108b) and the third EDN (108c).

In an embodiment, the UE (102) moves from the service area (706) of the third EDN (108c) towards the service area (702) of the first EDN (108a). While moving from the service area (706) of the third EDN (108c) towards the service area (702) of the first EDN (108a), the UE (102) enters into the third overlapping service area (712). The EEC (106) or the AC (104) of the UE (102) determines that the current location of the UE (102) is changed from the non-overlapped service area (706) of the third EDN (108c) to the third overlapping service area (712). In an alternate embodiment, the third EAS (110c) of the third EDN (108c) may also determine a presence of the UE (102) in the third overlapping service area (712). Based on the determination of the presence of the UE (102) in the third overlapping service area (712), the UE (102) executes one or more operational rules associated with the third overlapping service area (712). In an embodiment, the one or more operational rules associated with the third overlapping service area (712) are: a) establishing a connection between the EEC (106) and the first EES (112a) of the first EDN (108a) in addition to the already established connection of the EEC (106) with the third EES (112c) of the third EDN (108c), and b) initiating a capture and a transfer of the application context of the application service running at the UE (102) to the first EAS (110a) of the first EDN (108a). The one or more operational rules associated with the third overlapping service area (712) are further includes a) determining whether the UE is entering into the third overlapping service area (712) from the fourth overlapping service area (714) b) upon the determination that the UE is entering from the fourth overlapping service area (714), establishing a connection between the AC (104) and the first EAS (110a) of the first EDN (108a) while the AC (104) is connected to the third EAS (110c) of the third EDN (108c), and c) initiating a capture and a transfer of the application context between the third EAS (110c) of the third EDN (108c) and the first EAS (110a) of the first EDN (108a).

In another embodiment, the UE (102) moves from the service area (704) of the second EDN (108b) towards the service area (702) of the first EDN (108a). While moving from the service area (704) of the second EDN (108b) towards the service area (702) of the first EDN (108a), the UE (102) enters into the first overlapping service area (708). The EEC (106) or the AC (104) of the UE (102) determines that the current location of the UE (102) is changed from the non-overlapped service area (704) of the second EDN (108b) to the first overlapping service area (708). In an alternate embodiment, the second EAS (110b) of the second EDN (108b) may also determine a presence of the UE (102) in the first overlapping service area (708). Based on the determination of presence of the UE (102) in the first overlapping service area (708), the UE (102) executes one or more operational rules associated with the first overlapping service area (708). In an embodiment, the one or more operational rules associated with the first overlapping service area (708) are: a) establishing a connection between the EEC (106) and the first EES (112a) of the first EDN (108a) in addition to the already established connection of the EEC (106) with the second EES (112b) of the second EDN (108b), and b) initiating a capture and a transfer of the application context of the application service running at the UE (102) to the first EAS (110a) of the first EDN (108a). The one or more operational rules associated with the first overlapping service area (708) further includes a) determining whether the UE is entering into the first overlapping service area (708) from the fourth overlapping service area (714), b) upon a determination that the UE is entering from the fourth overlapping service area (714), establishing a connection between the AC (104) and the first EAS (110a) of the first EDN (108a) while the AC (104) is connected to the second EAS (110b) of the second EDN (108b), and initiating a capture and a transfer of the application context between the second EAS (110b) of the second EDN (108b) and the first EAS (110a) of the first EDN (108a).

In another embodiment, the UE (102) moves from the service area (704) of the second EDN (108b) towards the service area (706) of the third EDN (108c). While moving from the service area (704) of the second EDN (108b) towards the service area (706) of the third EDN (108c), the UE (102) enters into the second overlapping service area (710). The EEC (106) or the AC (104) of the UE (102) determines that the current location of the UE (102) is changed from the non-overlapped service area (704) of the second EDN (108b) to the second overlapping service area (710). In an alternate embodiment, the second EAS (110b) of the second EDN (108b) may also determine a presence of the UE (102) in the second overlapping service area (710). Based on the determination of the presence of the UE (102) in the second overlapping service area (710), the UE (102) executes one or more operational rules associated with the second overlapping service area (710). According to an embodiment, the one or more operational rules associated with the second overlapping service area (710) are: a) establishing a connection between the EEC (106) and the third EES (112c) of the third EDN (108c) in addition to the already established connection of the EEC (106) with the second EES (112b) of the second EDN (108b), and b) initiating a capture and a transfer of the application context of the application service running at the UE (102) to the third EAS (110c) of the third EDN (108c). The one or more operational rules associated with the second overlapping service area (710) further includes a) determining whether the UE is entering into the second overlapping service area (710) from the fourth overlapping service area (714), b) upon a determination that the UE is entering from the fourth overlapping service area (714), establishing a connection between the AC (104) and the third EAS (110c) of the third EDN (108c) while the AC (104) is connected to the second EAS (110b) of the second EDN (108b), and initiating a capture and a transfer of the application context between the second EAS (110b) of the second EDN (108b) and the third EAS (110c) of the third EDN (108c).

In another embodiment, when the UE (102) is present in the fourth overlapping service area (714), the UE executes the one or more operational rules associated with the fourth overlapping service area (714) which are: a) connecting the EEC (106) with the first EES (112a) of the first EDN (108a), the second EES (112b) of the second EDN (108b) and the third EES (112c) of the third EDN (108c), b) establishing a connection of the AC (104) with at least one of the first EAS (110a) of the first EDN (108a), the second EAS (110b) of the second EDN (108b) or the third EAS (110c) of the third EDN (108c), or continuing the connection of the AC (104) with the source EAS of the source EDN, and c) initiating a capture and a transfer of the application context with the first EAS (110a) of the first EDN (108a), the second EAS (110b) of the second EDN (108b) or the third EAS (110c) of the third EDN (108c). Therefore, when the UE (102) moves to any of the non-overlapped areas (702) of the first EDN (108a), the non-overlapped areas (704) of the second EDN (108b) or the non-overlapped areas (706) of the third EDN (108c), the target EAS of the target EDN has received the application context related to the application service running in the UE (102) to seamlessly resume the application service hence providing a seamless service continuity experience to the user.

FIGS. 8A and 8B collectively illustrate a sequential diagram representing a method (800) for providing seamless service continuity in the distributed wireless network system (100) during switching of the UE from the first EDN (108a) to the second EDN (108b), according to the embodiments as disclosed herein.

According to an embodiment of the present disclosure, the UE (102) traverses from the first EDN (108a) towards the second EDN (108b), and the method (800) is executed in order to achieve seamless service continuity to the UE during switching from the first EDN (108a) to the second EDN (108b). Accordingly, the first EDN (108a) is the source EDN for the UE (108a), as the UE (102) is currently connected to the first EDN (108a), and the second EDN (108b) is the target EDN for the UE (102), as the UE (102) will be getting connected to the second EDN (108b) in a short period of time.

At step 802, the UE (102) receives, via the EEC (106), application service availability information from the EES (112a) of the first EDN (108a). At step 804, the UE (102) receives, via the AC (104), application data packets related to the application services being consumed by the UE (102) from the EAS (110a) of the first EDN (108a). At step 806, the UE (102) receive, via the EEC (106), EDN service availability information of the second EDN (108a) from the ECS (114). At step 808, the UE (102) determines that the application service is available by both the first EDN (108a) and the second EDN (108b) based on the received application service availability information and the EDN service availability information. At step 810, the UE (102) detects a presence of the UE (102) in an overlapping service area based on the determination that the application service, running at the UE (102), is provided by both the first EDN (108a) and the second EDN (108b) in the current location of the UE (102). At step 812, upon determining that the UE (102) is present in the overlapping service area, the UE (102) notifies, via the EEC (106), the ECS (114) regarding the presence of UE in the overlapping service area. At step 814, the ECS (114) sends one or more operational rules associated with the overlapping service area to the UE (102). At step 816, the UE (102) executes the received one or more operational rules associated with the overlapping service area to the UE (102) for achieving seamless service continuity while switching from the first EDN (108a) to the second EDN (108b). Alternatively, the one or more operational rules related the overlapping service area can be pre-configured into the UE (102), or in the data networks and thus eliminated need of steps 812 and 814.

The execution of the one or more operational rules, at step 816, includes steps 818-838. At step 818, the UE (102) sends, via the EEC (106), a connection request to the second EES (112b) of the second EDN (108b). At 820, the second EES (112b) of the second EDN (108b) sends an acceptance of the connection request to the UE (102). In an alternate embodiment, if the EEC has a prior connection with the second EES (112b) of the second EDN (108b), step 818 and step 820 are skipped. At 822, the UE (102) notifies the first EES (112a) of the first EDN (108a) regarding the connection with the second EES (112b) of the second EDN (108b), and receives an acknowledgment from the first EES (112a) of the first EDN (108a). In an alternate embodiment, the EEC (106) of the UE (102) notifies the AC (104) of the UE (102) regarding the connection with the second EES (112b) of the second EDN (108b).

At step 824, upon receiving the notification from the UE (102), the first EES (112a) of the first EDN (108a) requests, to the first EAS (110a) of the first EDN (108a), to capture of the application context of the application service running at the first EAS (110a). In other words, the first EES (112a) of the first EDN (108a) initiates the capturing of the application context of the application service running at the first EAS (110a) by triggering the first EAS (110a) of the first EDN (108a). In an alternate embodiment, the AC (104) of the UE (102) initiates the capturing of the application context of the application service running at the first EAS (110a) of the first EDN (108a) by triggering the first EAS (110a) of the first EDN (108a). In other words, the AC (104) of the UE (102) requests, to the first EAS (110a) of the first EDN (108a), to capture of the application context of the application service running at the first EAS (110a). At step 826, the first EAS (110a) of the first EDN (108a) transfers the application context to the second EAS (110b) of the second EDN (108b). At step 828, upon successfully receiving the application context, the second EAS (110b) of the second EDN (108b) sends an acknowledgment to the first EAS (110a) of the first EDN (108a) indicating the reception of the application context. At step 830, the first EES (112a) of the first EDN (108a) sends a context transfer completion notification to the EEC (106) of the UE (102). At step 832, the AC (104) of the UE (102) switches from the first EAS (110a) of the first EDN (108a) to the second EAS (110b) of the second EDN (108b). At step 834, the second EAS (110b) of the second EDN (108b) notifies the first EAS (110a) of the first EDN (108a) about an establishment of a connection with the UE (102). At step 836, upon receiving the notification from the second EAS (110b) of the second EDN (108b), the first EAS (110a) of the first EDN (108a) sends end data packets or end marker packet to the AC (104) of the UE (102), and disconnects with the AC (104) of the UE (102). At step 838, the UE (102) continues availing the application service from the second EAS (110b) of the second EDN (108b).

In an alternate embodiment, steps 824-836 can execute without the involvement of the UE (102) but based on determination by the first EES (112a) the first EDN (108a) that the UE (102) is in a location where the both the first EDN (108a) and the second EDN (108b) provide service to the UE (102).

Accordingly, the configuring of the one or more operational rules to be followed by the UE based on the presence of the UE in the overlapping service area, provides the source EDN and the target EDN a better understanding of when and how to initiate capture and transfer of the application context so that when the UE (102) enters the target EDN the application context is already present for resuming the application service running at the UE (102). Therefore, no noticeable service lag or service interruption occurs during switching of the UE (102) from the source EDN which is the first EDN (108*a*) to the target EDN which is the second EDN (108*b*).

FIG. 9 illustrates a component diagram of the UE (900) for availing seamless service continuity during switching of the UE (900) from the source data network to the target data network, according to embodiments as disclosed herein. The UE (900) is an example of the UE (102) illustrated in the FIG. 1.

The UE (900) includes a processor (905), a communication interface (910), a memory (915), an edge-aware application (920), an edge enabler client (EEC) (925) associated with the edge-aware application (920) and an application client (AC) (930) associated with the edge-aware application (920), and a context transfer controller (935). The components of the UE (900) provided herein may not be exhaustive and that the UE (900) may include more or fewer components than that of depicted in FIG. 9. Further, two or more components may be embodied in one single component, and/or one component may be configured using multiple sub-components to achieve the desired functionalities. Some components of the UE (900) may be configured using hardware elements, firmware elements and/or a combination thereof.

The processor (905) is coupled with the memory (915), the communication interface (910), the context transfer controller (935), the edge-aware application (920), the EEC (925), and the AC (930). The processor (905) is configured to execute instructions stored in the memory (915) and to perform various processes. The communication interface (910) is configured for communicating internally between internal hardware components and with external devices via one or more networks. The communication interface (910) may be referred to as a transceiver. The AC (930) is an example of the AC (104) in the FIG. 1 and the EEC (925) is an example of the EEC (106) in the FIG. 1.

The processor (905) may include one or more processing units (e.g., in a multi-core configuration).

The memory (915) stores instructions to be executed by the processor (905). The memory (915) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (915) may, in some examples, be considered a non-transitory storage medium. The term "non-transitory" may indicate that the storage medium is not embodied in a carrier wave or a propagated signal. However, the term "non-transitory" should not be interpreted that the memory (915) is non-movable. In some examples, the memory (915) can be configured to store larger amounts of information than the memory. In certain examples, a non-transitory storage medium may store data that can, over time, change (e.g., in Random Access Memory (RAM) or cache).

In an embodiment, the EEC (925) and the AC (930) are connected with the first EDN (108*a*) initially before switching of the UE (900) to the second EDN (108*b*). After the UE (900) switches to the second EDN (108*b*), the EEC (925) and the AC (930) are connected with the second EDN (108*b*).

In an embodiment, the processor (905) is configured to determine a change of the current location of the UE (900). The processor (905) is further configured to determine, with the help of the EEC (925) or the AC (930), that the UE (900) is moving from the service area of the first EDN (108*a*) to the service area of the second EDN (108*b*). Alternatively, the processor (905) is also configured to determine, with the help of the EEC (925) or the AC (930), that the UE (900) is moving from the service area of the first EAS (110*a'*) to the service area of the first EAS (110*a*) within the same EDN (108*a*). Upon the determination, the processor (905) sends a context transfer initiation request to the context transfer controller (935). Upon receiving the request from the processor (905), the context transfer controller (935) determines whether the UE (900) is present in an overlapping service area of the one or more overlapping service areas between the first EDN (108*a*) and the second EDN (108*b*), or overlapping service area between the first EAS (110*a*) and the first EAS (110*a'*). Based on the presence of the UE (900) in the overlapping service area, the context transfer controller (935) executes one or more operational rules associated with the overlapping service area. The context transfer controller (935) further determines an internet protocol (IP) address of the second EDN (108*b*) and start transferring the application context related to the edge-aware application (920) running at the UE (900). The context transfer protocol (935) is also configured to manage connections of the EEC (925) and the AC (930) with the first EDN (108*a*) and the second EDN (108*b*) based on the one or more operational rules associated with the overlapping service area. The context transfer protocol (935) is also configured to inform the AC (930) regarding the connection of the UE (900) with the second EDN (108*b*) or with the target EAS (110*a*), and accordingly instructs the first EDN (108*a*) to send end data packets or end marker packet to the AC (104), and disconnects with the AC (104) of the UE (102).

FIG. 10 illustrates a component diagram of the edge configuration server (ECS) (1000) for providing seamless service continuity during switching of the UE (102) from the source data network to the target data network, according to embodiments as disclosed herein. The ECS (1000) is an example of the ECS (114) illustrated in the FIG. 1.

The ECS (1000) includes a processor (1002), a communication interface (1006), a memory (1004), a service area configuration controller (1008), and service area configuration database (1010). The components of the ECS (1000) provided herein may not be exhaustive and that the ECS (1000) may include more or fewer components than that of depicted in FIG. 10. Further, two or more components may be embodied in one single component, and/or one component may be configured using multiple sub-components to achieve the desired functionalities. Some components of the ECS (1000) may be configured using hardware elements, firmware elements and/or a combination thereof.

The processor (1002) is coupled with the memory (1004), the communication interface (1006), the service area configuration controller (1008), and the service area configuration database (1010). The processor (1002) is configured to execute instructions stored in the memory (1004) and to perform various processes. The communication interface (1006) is configured for communicating internally between internal hardware components and with external devices via one or more networks. The communication interface (1006) may be referred to as a transceiver.

The processor (1002) may include one or more processing units (e.g., in a multi-core configuration).

The memory (1004) stores instructions to be executed by the processor (1002). The memory (1004) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1004) may, in some examples, be considered a non-transitory storage medium. The term "non-transitory" may indicate that the storage medium is not embodied in a carrier wave or a propagated signal. However, the term "non-transitory" should not be interpreted that the memory (1004) is non-movable. In some examples, the memory (1004) can be configured to store larger amounts of information than the memory. In certain examples, a non-transitory storage medium may store data that can, over time, change (e.g., in Random Access Memory (RAM) or cache).

The processor (1002) may also be operatively coupled to the service area configuration database (1010). The database (1010) is any computer-operated hardware suitable for storing and/or retrieving data. The database (1010) may include, but not limited to, a storage area network (SAN) and/or a network attached storage (NAS) system. In other embodiments, the database (1010) may be external to the ECS (1000) and may be accessed by the ECS (1000) using a storage interface. The storage interface is any component capable of providing the processor (1002) with access to the database (1010).

In an embodiment, the processor (1002), is configured to receive data network connection requests from the UE (102), and further configured to render the details of the nearest available data network hosting the application service required by the UE (102). In an embodiment, the processor (1002) is further configured to store details of all the data networks in the memory (1004) and also store details of service areas between the data networks in the service area configuration database (1010). The processor is further configured to (1002) send, via the service area configuration controller (1008), one or more operational rules related to the overlapping service areas to the UE (102).

The embodiments disclosed herein can be implemented using at least one hardware device and performing network management functions to control the elements.

FIG. 11 illustrates a component diagram of the edge enabler server (EES) (1100) for providing seamless service continuity during switching of the UE (102) from the source data network to the target data network, according to embodiments as disclosed herein. The EES (1100) is an example of the first EES (112a) of the first EDN (108a) when the EDN (108a) is acting as a source data network.

The EES (1100) includes a processor (1102), a communication interface (1106), a memory (1104), an application services management controller (1110), and a context transfer controller (1108). The components of the EES (1100) provided herein may not be exhaustive and that the EES (1100) may include more or fewer components than that of depicted in FIG. 11. Further, two or more components may be embodied in one single component, and/or one component may be configured using multiple sub-components to achieve the desired functionalities. Some components of the EES (1100) may be configured using hardware elements, firmware elements and/or a combination thereof.

The processor (1102) is coupled with the memory (1104), the communication interface (1106), the application services management controller (1110) and the context transfer controller (1108). The processor (1102) is configured to execute instructions stored in the memory (1104) and to perform various processes. The communication interface (1106) is configured for communicating internally between internal hardware components and with external devices via one or more networks. The communication interface (1106) may be referred to as a transceiver.

The processor (1102) may include one or more processing units (e.g., in a multi-core configuration).

The memory (1104) stores instructions to be executed by the processor (1102). The memory (1104) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1030) may, in some examples, be considered a non-transitory storage medium. The term "non-transitory" may indicate that the storage medium is not embodied in a carrier wave or a propagated signal. However, the term "non-transitory" should not be interpreted that the memory (1104) is non-movable. In some examples, the memory (1104) can be configured to store larger amounts of information than the memory. In certain examples, a non-transitory storage medium may store data that can, over time, change (e.g., in Random Access Memory (RAM) or cache).

In an example embodiment, the EES (1100) may act as a source EES in the source edge data network of the UE (102) hosting multiple EASs (110a-110n). In order to facilitate EES functionality as the source EES, the processor (1002), is configured to receive registration request from multiple EASs (110) via the communication interface (1120). The received registration request is authenticated by the processor (1102) for facilitating secure data communication. Upon successful authentication, the EASs (110a-110n) are registered with the EES (1100). The processor (1102) is further configured to instruct storage of the registration details of the EASs (110a-110n). The registration details of the EASs (110a-110n) includes a list of service areas served by the EASs (110a-110n), a location of the EASs (110a-110n), a registration information of the EASs (110a-110n) with the source EES, an availability information of the EASs (110a-110n), and an identifier of the EASs (110a-110n).

The application management controller (1110) is configured to fetch different parameters related to each application services associated with the EES (1100) such as bandwidth requirement of the application service, a size of application context of the application service, and/or the like.

In an embodiment, the processor (1102) is configured to determine movement of the UE (102) from the service area of the first EDN (108a) to the service area of the second EDN (108b). Upon the determination, the processor (1102) sends a context transfer initiation request to the context transfer controller (1108). Upon receiving the request from the processor (1102), the context transfer controller (1108) determines whether the UE (102) is present in an overlapping service area of the one or more overlapping service areas between the first EDN (108a) and the second EDN (108b). Based on the presence of the UE (102) in the overlapping service area, the context transfer controller (1108) executes one or more operational rules associated with the overlapping service area provided by the UE (102). The context transfer controller (1108) further determines an internet protocol (IP) address of the second EDN (108b) and start transferring the application context related to the application service (920) running at the UE (102). The context transfer protocol (1108) is also configured to inform the EEC (925) regarding the connection of the UE (102) with the second EDN (108b). The context transfer protocol (1108) is also configured to instruct the first EAS (110a) of the first EDN (108a) to send end data packets or end marker packet to the AC (104), and accordingly disconnect with the AC (104).

The embodiments disclosed herein can be implemented using at least one hardware device and performing network management functions to control the elements.

FIG. 12 illustrates a component diagram of the edge application server (EES) (1200) for providing seamless service continuity during switching of the UE (102) from the source data network to the target data network, according to embodiments as disclosed herein. The EAS (1200) is an example of the EAS (110a) of the first EDN (108a) when the EDN (108a) is a source data network.

The EAS (1200) includes a processor (1202), a communication interface (1206), a memory (1204), an application services management controller (1210), and a context transfer controller (1208). The components of the EAS (1200) provided herein may not be exhaustive and that the EAS (1200) may include more or fewer components than that of depicted in FIG. 11. Further, two or more components may be embodied in one single component, and/or one component may be configured using multiple sub-components to achieve the desired functionalities. Some components of the EAS (1200) may be configured using hardware elements, firmware elements and/or a combination thereof.

The processor (1202) is coupled with the memory (1204), the communication interface (1206), the application services management controller (1210) and the context transfer controller (1208). The processor (1202) is configured to execute instructions stored in the memory (1204) and to perform various processes. The communication interface (1206) is configured for communicating internally between internal hardware components and with external devices via one or more networks. The communication interface (1206) may be referred to as a transceiver.

The processor (1202) may include one or more processing units (e.g., in a multi-core configuration).

The memory (1204) stores instructions to be executed by the processor (1202). The memory (1204) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1030) may, in some examples, be considered a non-transitory storage medium. The term "non-transitory" may indicate that the storage medium is not embodied in a carrier wave or a propagated signal. However, the term "non-transitory" should not be interpreted that the memory (1204) is non-movable. In some examples, the memory (1204) can be configured to store larger amounts of information than the memory. In certain examples, a non-transitory storage medium may store data that can, over time, change (e.g., in Random Access Memory (RAM) or cache).

In an example embodiment, the EAS (1200) may act as a source EAS in the source edge data network of the UE (102). In order to facilitate EAS functionality as the source EAS, the processor (1202), is configured to connect to the AC (104) of the UE (102) and send application context to the UE (102) for the application service running on the UE (102).

The application management controller (1210) is configured to fetch different parameters related to each UEs (102) and EESs (1200) associated with the EAS (1200) such as internet protocol (IP) address of the nearest EDNs or IP address of the UE (102), or IP address of the EDNs (108) with which the EAS (1200) is connected, service areas of the EDNs (108), overlapping service areas between the EDNs (108), and/or the like.

In an embodiment, the processor (1202) is configured to determine movement of the UE (102) from the service area of the first EDN (108a) to the service area of the second EDN (108b). Upon the determination, the processor (1202) sends a context transfer initiation request to the context transfer controller (1208). Upon receiving the request from the processor (1202), the context transfer controller (1208) determines whether the UE (102) is present in an overlapping service area of the one or more overlapping service areas between the first EDN (108a) and the second EDN (108b). This determination can be based on an explicit indication received from the AC (104) or the EES (112). Based on the presence of the UE (102) in the overlapping service area or the received indication, the context transfer controller (1208) executes one or more operational rules associated with the overlapping service area provided by the UE (102). The context transfer controller (1208) further determines an (IP) address of the second EDN (108b) and start transferring the application context related to the application service (920) running at the UE (102). The context transfer protocol (1208) can also be configured to inform the AC (930) regarding the connection of the UE (102) with the second EDN (108b). The context transfer protocol (1208) is also configured to send end data packets or the end market packet to the second EAS (110b) AC (104), and accordingly disconnect with the AC (104).

The embodiments disclosed herein can be implemented using at least one hardware device and performing network management functions to control the elements.

FIGS. 13A and 13B collectively illustrate a flow chart illustrating a method (1300) for providing seamless service continuity during switching of the UE (102) from the source data network to the target data network, according to an embodiment as disclosed herein.

At S1302, the method (1300) includes facilitating deployment, by the service provider (122), one or more overlapping service areas between the first data network and the second data network. In an example embodiment, the first data network and the second data network may corresponds to the cloud data network (116) and the edge data networks (108a-108n). Alternatively, the first data network may also correspond to the service area of the source EAS (110a') and the second data network may correspond to the service area of the target EAS (110a).

At S1304, the method (1300) includes defining, by the ECS (114), one or more operational rules for each overlapping service area of the one or more deployed overlapping service area.

At S1306, the method (1300) includes configuring, by the ECS (114), the one or more operational rules in the UE (102). The operational rules can be preconfigured in the UE (102) or the operational rules may be configured in UE (102) based on a request received from UE (102).

At S1308, the method (1300) includes receiving, by the UE (102), an application service from the first data network.

At S1310, the method (1300) includes determining, by the UE (102) or by an application server (such as the cloud AS (118) or the EASs (110a-110n)) or the EES (112) of the first data network, a movement of the UE (102) from the service area of the first data network towards the service area of the second data network.

At S1312, the method (1300) includes determining, by the UE (102) or by the application server of the first data network or the EES (112), a presence of the UE (102) in the one or more overlapping service areas between the first data network and the second data network based on the determination of the UE in a location where the application service is provided by both the first data network and the second data network.

At S1314, the method (1300) includes executing, by the UE (102), the configured one or more operational rules associated with the overlapping service area in which the UE (102) has moved while switching from the first data network to the second data network.

At S1316, the method (1300) includes initiating, by the UE (102) or by an application server (cloud AS (118) or the EAS (110)) or the EES (112) of the first data network, a capture of the application context related to the application service being provided to the UE (102) by the application server (cloud AS (118) or the EAS (110)) of the first data network.

At S1318, the method (1300) includes connecting, by the UE (102), the AC (104) with the application server (cloud AS (118) or the EAS (110)) of the second data network based on determination of provision of better QoS by the second data network.

At S1320, the method (1300) includes initiating, by the UE (102) or by an application server (cloud AS (118) or the EAS (110)) of the first data network, a transfer of the captured application context related to the application service running at the UE (102) to the application server (cloud AS (118) or the EAS (110)) of the second data network.

At S1322, the method (1300) includes disconnecting, by the UE (102), the AC (104) from the application server (cloud AS (118) or the EAS (110)) of the first data network upon successful transfer of the application context.

In an alternate embodiment, steps S1318 and S1320 can occur in parallel or in reverse order.

At S1324, the method (1300) includes continuing, by the UE (102), the application service from the second data network.

The various actions, acts, blocks, steps, or the like in the method (1300) in the flow chart may be performed in the order presented, in a different order or simultaneously. Further, in some embodiments, some of the actions, acts, blocks, steps, or the like may be omitted, added, modified, skipped, or the like without departing from the scope of the invention.

FIG. 14 is a flow chart illustrating a method (1400) for providing seamless service continuity during switching of the UE (102) from the source data network to the target data network, according to an embodiment as disclosed herein. The steps (S1402-S1410) are performed by the processor (910).

At S1402, the method (1400) includes receiving, by the UE (102), the service from the first EAS (110a) while the UE (102) is connected with the first EDN (108a), and the cloud AS (118) while the UE (102) is connected with the cloud data network (116).

At S1404, the method (1400) includes determining, by at least one of the EEC (106) of the UE (102), the first EES (112a) associated with the first EAS (110a), and the first EAS (110a), that the current location of the UE (102) is served by both a second EAS (110b), and one of the first EAS (110a) and the cloud AS (118).

At S1406, the method (1400) includes initiating for transferring, by at least one of the EEC (106) and the first EES (112a) an application context related to the service by triggering the first EAS (110a) based on the determination that the current location of the UE (102) is served by both the second EAS (110b), and one of the first EAS (110a) and the cloud EAS (118). In another embodiment, the method (1400) includes transferring, by at least one of the first EAS (110a) and the first EES (112a), the application context related to the service to the second EAS (110b).

At S1408, the method (1400) includes establishing, by the UE (102), a connection of the UE (102) with both the second EAS (110b) and a second EES (112b) associated with the second EAS (110b).

At S1410, the method (1400) includes disconnecting, by the UE (102), the service using the first EAS (110a) and the first EES (112a).

At S1412, the method (1400) includes continuing, by the UE (102), the service using the established connection with both the second EAS (110b) and the second EES (112b).

The various actions, acts, blocks, steps, or the like in the flow chart (S1400) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method for providing continuity for a service by a user equipment (UE) in a wireless communication network system, the method comprising:
    connecting, by an application client (AC) in the UE, to a first edge application server (EAS);
    receiving, by the AC in the UE from the first EAS, data packets related to the service;
    identifying a second EAS that provides the service at a location of the UE, wherein the second EAS is different from the first EAS;
    transmitting, by an edge enabler client (EEC) in the UE to a first edge enabler server (EES) associated with the first EAS, information regarding a connection with a second EES associated with the second EAS;
    initiating, by the AC in the UE, a transfer of application context of the service from the first EAS to the second EAS; and
    connecting the service from the second EAS and disconnecting the service from the first EAS,
    wherein the first EES and the first EAS are included in a first edge data network (EDN), and
    wherein the second EES and the second EAS are included in a second EDN.

2. The method of claim 1, further comprising:
    transmitting, to an edge configuration server (ECS), information that the UE locates in a service area in response to service availability information;
    receiving, from the ECS, operational rules of the service area in response to the information that the UE locates in the service area; and
    executing the received operational rules.

3. A method for providing continuity for a service by a first edge application server (EAS) in a wireless communication network system, the method comprising:
- connecting with an application client (AC) in a user equipment (UE);
- transmitting, to the UE, data packets related to the service;
- receiving, from the UE, information related to the connection of the UE with a second EAS, wherein a transfer of application context of the service from the first EAS to the second EAS is initiated by the AC in the UE;
- transmitting, to the UE, information including a notification that indicates the transfer of the application context of the service to the second EAS is completed;
- transmitting, to the UE, end data packets related to the service in response to receiving a notification about establishment of the connection of the UE with the second EAS; and
- disconnecting a connection of the UE,
- wherein the first EAS and a first edge enabler server (EES) associated with the first EAS are included in a first edge data network (EDN), and
- wherein the second EAS and a second EES associated with the second EAS are included in a second EDN.

4. The method of claim 3, further comprising:
- receiving, from the UE, a request for capturing the application context of the service and transferring the captured application context of the service to the second EAS;
- in response to receiving the request, capturing the application context of the service and transmitting, to the second EAS, the captured application context of the service to the second EAS; and
- in response to transmitting the captured application context of the service to the second EAS, receiving, from the second EAS, a response indicating an acknowledgement of the captured application context of the service.

5. A method for providing continuity for a service by a second edge application server (EAS) in a wireless communication network system, the method comprising:
- receiving, from a user equipment (UE), a connection request;
- transmitting, to the UE, a connection response indicating that the connection request is accepted;
- after a connection of the UE with a first EAS is switched to a connection of the UE with the second EAS, transmitting, to the first EAS, information related to the connection of the UE with the second EAS; and
- transmitting, to the UE, data packets related to the service after transmitting the information related to the connection of the UE with the second EAS,
- wherein a transfer of application context of the service from the first EAS to the second EAS is initiated by an application client in the UE,
- wherein the first EAS and a first edge enabler server (EES) associated with the first EAS are included in a first edge data network (EDN), and
- wherein the second EAS and a second EES associated with the second EAS are included in a second EDN.

6. The method of claim 5, further comprising:
- receiving, from the first EAS, the application context of the service; and
- transmitting, to the first EAS, a response indicating an acknowledgement of the application context of the service.

7. A user equipment (UE) for providing a continuity for a service in a wireless communication network system, the UE comprising:
- a transceiver; and
- at least one processor coupled with the transceiver and configured to control to:
  - connect, by an application client (AC) in the UE, to a first edge application server (EAS),
  - receive, by the AC in the UE from the first EAS, data packets related to the service,
  - identify a second EAS that provides the service at a location of the UE, wherein the second EAS is different from the first EAS,
  - transmit, by an edge enabler client (EEC) in the UE to a first edge enabler server (EES) associated with the first EAS, information regarding a connection with a second EES associated with the second EAS,
  - initiate, by the AC in the UE, a transfer of application context of the service from the first EAS to the second EAS, and
  - connect the service from the second EAS and disconnect the service from the first EAS,
- wherein the first EES and the first EAS are included in a first edge data network EDN), and
- wherein the second EES and the second EAS are included in a second EDN.

8. The UE of claim 7, wherein the at least one processor is configured to control to:
- transmit, to an edge configuration server (ECS), information that the UE locates in a service area in response to service availability information,
- receive, from the ECS, operational rules of the service area in response to the information that the UE locates in the service area, and
- execute the received operational rules.

9. A first edge application server (EAS) for providing a continuity for a service in a wireless communication network system, the first EAS comprising:
- a transceiver; and
- at least one processor coupled with the transceiver and configured to control to:
  - connect with an application client (AC) in a user equipment (UE),
  - transmit, to the UE, data packets related to the service,
  - receive, from the UE, information related to the connection of the UE with a second EAS, wherein a transfer of application context of the service from the first EAS to the second EAS is initiated by the AC in the UE,
  - transmit, to the UE, information including a notification that indicates the transfer of the application context of the service to the second EAS is completed,
  - transmit, to the UE, end data packets related to the service in response to receiving a notification about establishment of the connection of the UE with the second EAS, and
  - disconnect a connection of the UE,
- wherein the first EAS and a first edge enabler server (EES) associated with the first EAS are included in a first edge data network (EDN), and
- wherein the second EAS and a second EES associated with the second EAS are included in a second EDN.

10. A second edge application server (EAS) for providing a continuity for a service in a wireless communication network system, the second EAS comprising:
- a transceiver; and at least one processor coupled with the transceiver and configured to control to:
  receive, from a user equipment (UE), a connection request,
  transmit, to the UE, a connection response indicating that the connection request is accepted,
  after a connection of the UE with a first EAS is switched to a connection of the UE with the second EAS, transmit, to the first EAS, information related to the connection of the UE with the second EAS, and
  transmit, to the UE, data packets related to the service after transmitting the information related to the connection of the UE with the second EAS,
wherein a transfer of application context of the service from the first EAS to the second EAS is initiated by an application client in the UE,
wherein the first EAS and a first edge enabler server (EES) associated with the first EAS are included in a first edge data network (EDN), and
wherein the second EAS and a second EES associated with the second EAS are included in a second EDN.

* * * * *